United States Patent
Kokengada et al.

(10) Patent No.: US 10,887,811 B2
(45) Date of Patent: Jan. 5, 2021

(54) SERVICE CONTINUITY OF REAL-TIME TEXT AND TELETYPEWRITER MODES

(71) Applicant: QUALCOMM Incorporated, San Diego, CA (US)

(72) Inventors: Sanjeeth Ganapathy Kokengada, Bangalore (IN); Sarat Chandra Battini, Bangalore (IN); Vinaya Kumara T. V., Tumkur (IN); Ramachandran Subramanian, San Diego, CA (US); Arindam Ghosh, Bangalore (IN)

(73) Assignee: QUALCOMM Incorporated, San Diego, CA (US)

( * ) Notice: Subject to any disclaimer, the term of this patent is extended or adjusted under 35 U.S.C. 154(b) by 57 days.

(21) Appl. No.: 16/216,421

(22) Filed: Dec. 11, 2018

(65) Prior Publication Data

US 2020/0187078 A1  Jun. 11, 2020

(51) Int. Cl.
| | |
|---|---|
| *H04L 12/58* | (2006.01) |
| *H04W 36/30* | (2009.01) |
| *H04W 24/10* | (2009.01) |
| *H04W 36/00* | (2009.01) |

(52) U.S. Cl.
CPC .............. *H04W 36/30* (2013.01); *H04L 51/04* (2013.01); *H04W 24/10* (2013.01); *H04W 36/0058* (2018.08); *H04W 36/0088* (2013.01)

(58) Field of Classification Search
CPC ....... H04L 51/04; H04L 67/06; H04L 51/066; H04L 67/04; H04L 51/38; H04W 76/50; H04W 84/042; H04W 68/005; H04W 4/12; H04W 36/0022; H04W 76/10
See application file for complete search history.

(56) References Cited

U.S. PATENT DOCUMENTS

| | | | |
|---|---|---|---|
| 2004/0203937 A1* | 10/2004 | Mauro, II | H04M 3/42 455/464 |
| 2006/0171510 A1* | 8/2006 | Mundra | H04L 29/06027 379/52 |
| 2006/0258400 A1 | 11/2006 | Lee | |
| 2007/0038943 A1* | 2/2007 | FitzGerald | G06Q 10/10 715/752 |

(Continued)

OTHER PUBLICATIONS

International Search Report and Written Opinion—PCT/US2019/065271—ISA/EPO—dated Feb. 12, 2020.

*Primary Examiner* — Jung Liu
(74) *Attorney, Agent, or Firm* — Holland & Hart LLP

(57) ABSTRACT

Methods, systems, and devices for wireless communications are described. Some wireless communications systems may transition between a real-time texting (RTT) mode and a text teletypewriter (TTY) mode and vice versa, on a user equipment (UE). A UE may make a determine to transition between two texting modes while coordinating the transfer of text data between the different modes. Some wireless communications systems may also transition a UE between a packet switched network and a circuit switched network without loss of signal and consistent text data delivery during the communication without losing the text data during the transition between the two coverage areas. Transitioning between modes and networks may provide a user with interoperability and the benefit of conveniently switching between two modes without service interruption.

30 Claims, 16 Drawing Sheets

(56) References Cited

U.S. PATENT DOCUMENTS

| | | | |
|---|---|---|---|
| 2008/0187108 A1* | 8/2008 | Engelke | G10L 15/265 |
| | | | 379/52 |
| 2008/0260113 A1 | 10/2008 | Jean et al. | |
| 2008/0293384 A1* | 11/2008 | Jones | H04L 51/066 |
| | | | 455/412.1 |
| 2010/0228546 A1* | 9/2010 | Dingler | G09B 21/009 |
| | | | 704/235 |
| 2012/0034938 A1* | 2/2012 | Kreitzer | H04L 51/04 |
| | | | 455/466 |
| 2016/0337282 A1* | 11/2016 | Kallio | H04L 51/066 |
| 2016/0337908 A1* | 11/2016 | Poikselka | H04W 4/90 |
| 2017/0085506 A1* | 3/2017 | Gordon | H04L 51/046 |
| 2018/0206100 A1* | 7/2018 | Eisner | H04W 64/00 |
| 2019/0014613 A1* | 1/2019 | Antsev | H04M 1/72519 |
| 2019/0020607 A1* | 1/2019 | Chiang | H04L 67/06 |
| 2019/0068658 A1* | 2/2019 | Chiang | H04L 65/1089 |
| 2019/0069142 A1* | 2/2019 | Chiang | H04W 4/12 |
| 2019/0095422 A1* | 3/2019 | Chiang | H04L 51/04 |
| 2020/0092340 A1* | 3/2020 | Chiang | H04L 65/4015 |

\* cited by examiner

SERVICE CONTINUITY OF REAL-TIME TEXT AND TELETYPEWRITER MODES

BACKGROUND

The following relates generally to wireless communications, and more specifically to service continuity of real-time text and teletypewriter modes.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

People communicate with one another using a number of different technologies such as telephones, cell phones, and computers for instant messaging, video conferencing, and emailing. Although a number of communication technologies are available, some technologies may be more appropriate than others for people with hearing disabilities. For example, with a hearing disability, using video conferencing and texting may be easier to use than a telephone or cell phone. In the event a person with a hearing disability may wish to use a telephone or cell phone, these devices may be adapted appropriately. For example, a telephone may be utilized with teletypewriter (TTY) technology, so that a hearing disabled person may communicate using a telephone. TTY devices may be plugged into a telephone, or even a cell phone, to allow the user to send a real-time text message to a second user over the TTY device. Additionally, real-time texting (RTT) technology has been developed specifically for use with a cell phone. Conventional techniques are deficient as switching between RTT to TTY may experience service interruptions.

SUMMARY

The described techniques relate to improved methods, systems, devices, and apparatuses that support service continuity of real-time text (RTT) and teletypewriter (TTY) between packet-switched networks (PS) to PS or PS to circuit-switched networks (CS). Generally, the described techniques provide for seamless switching between texting modes while connected to a same network or switching between networks.

In some examples, a texting session may be activated while a user equipment (UE, for example, a cell phone) operates in either an RTT or a TTY mode. The UE may transmit, via a texting session, first text data to a base station while operating in a first texting mode. At some time, the UE may determine that it may be desirable to perform a mode switch by switching from the first texting mode to a second texting mode. In some cases, a user may plug in a TTY device, and the UE may determine to switch from an RTT mode to a TTY mode. In another example, a user may disconnect a TTY device from the UE, and the UE may determine to switch from a TTY mode to an RTT mode. In another example, a serving base station in a PS network may determine to handover the UE to a CS network that supports a TTY mode, and not an RTT mode. When the UE determines to perform a mode switch, a modem text interface of the UE may receive buffered text data of the texting session from an RTT interface or a TTY device, and may initiate the second texting mode. The modem text interface of the UE may pass the receive buffered text data from the first texting mode to the second texting mode (e.g., pass from the RTT interface to the TTY device, or vice versa) to enable a seamless transition from the first texting mode to the second texting mode. The UE may then transmit, via the texting session, the second text data to the base station while operating in the second texting mode.

A method for wireless communication by a UE is described. The method may include transmitting, via a texting session, first text data to a base station while operating in a first texting mode, determining to perform a mode switch to switch from operating in the first texting mode to operating in a second texting mode, receiving buffered text data of the texting session, initiating the second texting mode based on receiving the buffered text data and determining to perform the mode switch, and transmitting, via the texting session, second text data to the base station while operating in the second texting mode.

An apparatus for wireless communication by a UE is described. The apparatus may include a processor, memory in electronic communication with the processor, and instructions stored in the memory. The instructions may be executable by the processor to cause the apparatus to transmit, via a texting session, first text data to a base station while operating in a first texting mode, determine to perform a mode switch to switch from operating in the first texting mode to operating in a second texting mode, receive buffered text data of the texting session, initiate the second texting mode based on receiving the buffered text data and determining to perform the mode switch, and transmit, via the texting session, second text data to the base station while operating in the second texting mode.

Another apparatus for wireless communication by a UE is described. The apparatus may include means for transmitting, via a texting session, first text data to a base station while operating in a first texting mode, means for determining to perform a mode switch to switch from operating in the first texting mode to operating in a second texting mode, means for receiving buffered text data of the texting session, means for initiating the second texting mode based on receiving the buffered text data and determining to perform the mode switch, and means for transmitting, via the texting session, second text data to the base station while operating in the second texting mode.

A non-transitory computer-readable medium storing code for wireless communication by a UE is described. The code may include instructions executable by a processor to transmit, via a texting session, first text data to a base station while operating in a first texting mode, determine to perform a mode switch to switch from operating in the first texting mode to operating in a second texting mode, receive buffered text data of the texting session, initiate the second texting mode based on receiving the buffered text data and determining to perform the mode switch, and transmit, via the texting session, second text data to the base station while operating in the second texting mode.

In some examples of the method, apparatuses, and non-transitory computer-readable medium described herein, the first texting mode may be one of a TTY mode and an RTT mode and the second texting mode may be the other of the TTY mode and the RTT mode.

Some examples of the method, apparatuses, and non-transitory computer-readable medium described herein may further include operations, features, means, or instructions for transmitting a text buffer request to an RTT interface based on determining to perform the mode switch, where the first texting mode may be an RTT mode.

Some examples of the method, apparatuses, and non-transitory computer-readable medium described herein may further include operations, features, means, or instructions for initiating closing of the RTT interface based on receiving the buffered text data.

In some examples of the method, apparatuses, and non-transitory computer-readable medium described herein, initiating the second texting mode further may include operations, features, means, or instructions for detecting that a TTY device may have been connected to the UE, and transmitting the buffered text data to the TTY device.

In some examples of the method, apparatuses, and non-transitory computer-readable medium described herein, initiating the second texting mode further may include operations, features, means, or instructions for activating an input control associated with the TTY device, establishing a communication channel between a modem of the UE and the TTY device, and communicating the second text data between the modem and the TTY device via the communication channel.

In some examples of the method, apparatuses, and non-transitory computer-readable medium described herein, detecting that the TTY device may have been connected further may include operations, features, means, or instructions for receiving a signal from the TTY device.

In some examples of the method, apparatuses, and non-transitory computer-readable medium described herein, receiving the buffered text data further may include operations, features, means, or instructions for receiving the buffered text data from a TTY device, where the first texting mode may be a TTY mode.

In some examples of the method, apparatuses, and non-transitory computer-readable medium described herein, initiating the second texting mode further may include operations, features, means, or instructions for detecting that the TTY device may have been disconnected from the UE.

Some examples of the method, apparatuses, and non-transitory computer-readable medium described herein may further include operations, features, means, or instructions for closing a communication channel between a modem of the UE and the TTY device to terminate the first texting mode.

In some examples of the method, apparatuses, and non-transitory computer-readable medium described herein, initiating the second texting mode further may include operations, features, means, or instructions for transmitting an initiate RTT mode request to an RTT interface for initiating an RTT mode, where the second texting mode may be the RTT mode.

In some examples of the method, apparatuses, and non-transitory computer-readable medium described herein, initiating the second texting mode further may include operations, features, means, or instructions for initiating a back-off timer for a fallback voice call based on transmitting the initiate RTT mode request.

In some examples of the method, apparatuses, and non-transitory computer-readable medium described herein, initiating the second texting mode further may include operations, features, means, or instructions for terminating the back-off timer based on receiving an indication that the RTT mode may have been initiated.

In some examples of the method, apparatuses, and non-transitory computer-readable medium described herein, initiating the second texting mode further may include operations, features, means, or instructions for transmitting the buffered text data to the RTT interface for activating an RTT interface, and communicating, in accordance with the RTT mode, the second text data between a modem and the RTT interface.

In some examples of the method, apparatuses, and non-transitory computer-readable medium described herein, receiving the buffered text data further may include operations, features, means, or instructions for receiving an indication that an RTT mode may have been initiated, where the second texting mode may be the RTT mode, transmitting a text buffer request to a TTY device based on the indication, and receiving the buffered text data based on the text buffer request.

Some examples of the method, apparatuses, and non-transitory computer-readable medium described herein may further include operations, features, means, or instructions for closing a communication channel between a modem of the UE and the TTY device based on receiving the buffered text data.

In some examples of the method, apparatuses, and non-transitory computer-readable medium described herein, initiating the second texting mode further may include operations, features, means, or instructions for transmitting a request to activate an RTT interface, and communicating, in accordance with the RTT mode, the second text data between a modem and the RTT interface.

Some examples of the method, apparatuses, and non-transitory computer-readable medium described herein may further include operations, features, means, or instructions for transmitting a measurement report to the base station, and receiving a handover command based on the measurement report.

In some examples of the method, apparatuses, and non-transitory computer-readable medium described herein, determining to perform the mode switch further may include operations, features, means, or instructions for determining to perform the mode switch based on receiving the handover command.

In some examples of the method, apparatuses, and non-transitory computer-readable medium described herein, the handover command instructs the UE to perform a handover from a packet switched network to a circuit switched network.

Some examples of the method, apparatuses, and non-transitory computer-readable medium described herein may further include operations, features, means, or instructions for transmitting a suspend command for indicating to a circuit switched network to suspend the text session during the mode switch based on receiving the buffered text data.

Some examples of the method, apparatuses, and non-transitory computer-readable medium described herein may further include operations, features, means, or instructions for transmitting a buffer request to an RTT interface based on the handover command, where the first texting mode may be an RTT mode, and where receiving the buffered text data may be based on transmitting the text buffer request.

Some examples of the method, apparatuses, and non-transitory computer-readable medium described herein may further include operations, features, means, or instructions for transmitting the buffered text data to a TTY device, activating an input control associated with the TTY device, establishing a communication channel between a modem of the UE and the TTY device, and communicating the second text data between the modem and the TTY device via the communication channel.

DETAILED DESCRIPTION

Figure 1:
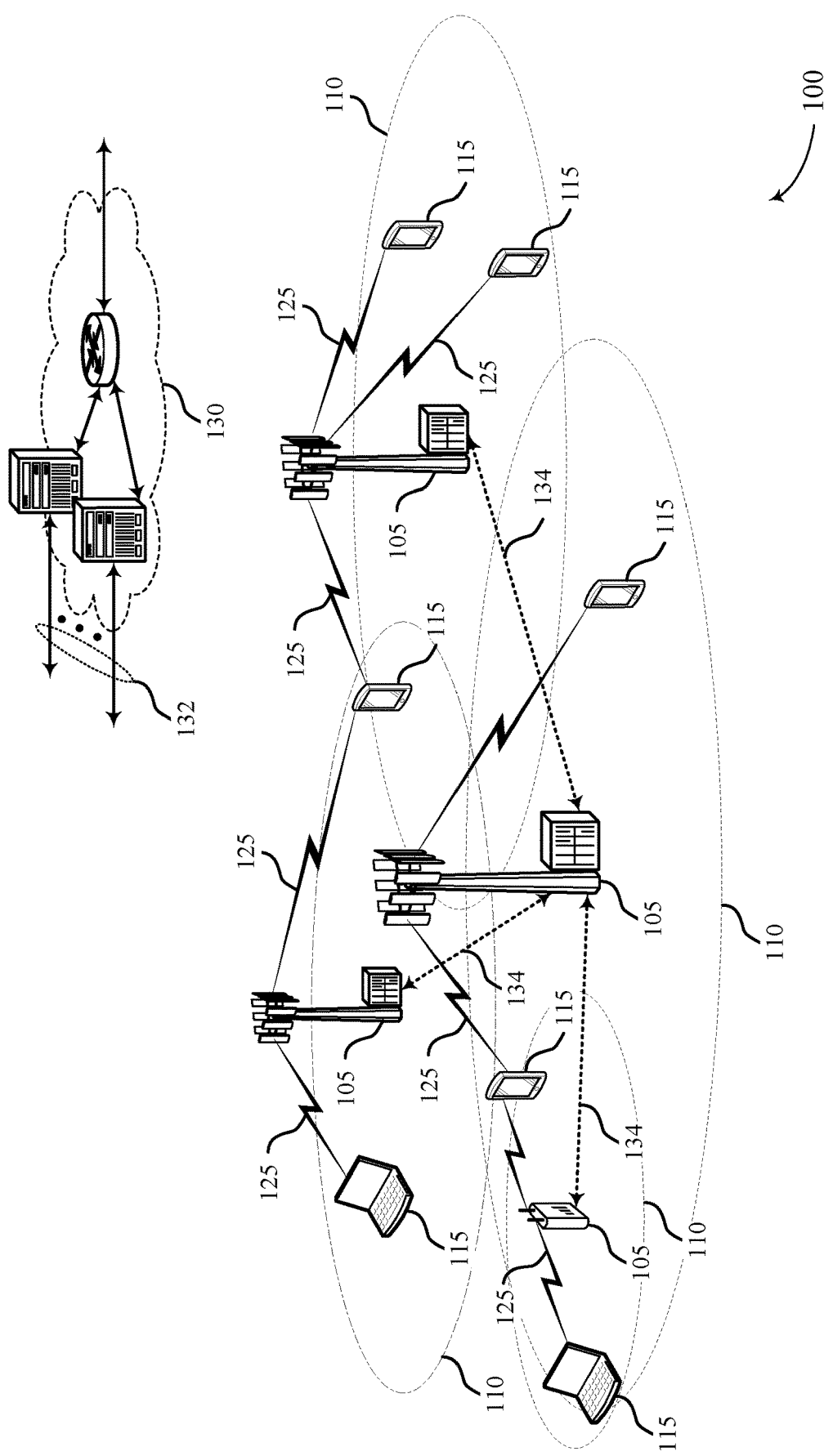
FIG. 1 illustrates an example of a system for wireless communications that supports service continuity of real-time text and teletypewriter modes in accordance with aspects of the present disclosure.

Generally, the described techniques provide for seamless switching between texting modes while connected to a same network or switching between networks. When using a real-time text (RTT) mode or teletypewriter (TTY) device, a number of issues may arise. One common problem occurs when switching between the two technologies. For example, a user may be communicating with a second user via a TTY device that is plugged into a user equipment (e.g., a cell phone). The service may be interrupted should the user accidentally unplug the TTY device as the cell phone may switch to a voice call, or the call or texting session may be interrupted or be dropped. In another example, TTY devices are supported by packet-switched networks and circuit-switched networks and RTT devices are supported by packet-switched networks. When a user initiates a texting session and is using either one of RTT or TTY and crosses into the other network, the communication may also be interrupted causing an inconvenience to the user.

Transitioning between a TTY mode, an RTT mode, a packet-switched (PS) network, and a circuit-switched network (CS) may present some benefits to users with hearing disabilities. In some cases, the interoperability of being able to switch between PS networks and CS networks may ensure fewer interrupted connections and conversations and less loss of signal. In some examples, CS networks may support a TTY mode and will not support an RTT mode. Accordingly, in the example where a user initiates a communication on a PS network using the RTT mode and transitions to a CS network, the UE may switch from an RTT mode to a TTY mode. TTY may be a teletypewriter, text telephony, text teletypewriter, or any other similar industry term. The switch between networks may provide a user with continuous service and coverage.

In some cases, the ability to switch between RTT mode and TTY mode may allow the user to freely and dynamically plug-in or unplug the TTY device at the user's convenience, as opposed to having to wait for a mode switch event between the RTT mode and the TTY mode.

In some cases, a text session may be initiated in a first mode, such as an RTT or TTY mode. Data, such as first text data may be transmitted via the texting session to a base station while still in the first texting mode. The determination may then be made to perform a mode switch, to switch from operating in the first texting mode, such as an RTT mode to a second texting mode such as a TTY mode, or vice versa. The second texting mode interface may receive buffered text data of the texting session, so that the text entered by the user may not be lost. The second texting mode, a TTY mode in this example, may be initiated and then the text data may be transmitted via the texting session to the base station while operating in the second text mode, such as the TTY mode.

Aspects of the disclosure are initially described in the context of a wireless communications system. Example wireless communication systems and communication schemes for switching between modes and networks coverage areas, as well as process flows for implementing techniques discussed herein are then described. Aspects of the disclosure are further illustrated by and described with reference to apparatus diagrams, system diagrams, and communication schemes that relate to service continuity of real-time text and teletypewriter modes.

FIG. 1 illustrates an example of a wireless communications system 100 that supports service continuity of real-time text and teletypewriter modes in accordance with aspects of the present disclosure. The wireless communications system 100 includes base stations 105, UEs 115, and a core network 130. In some examples, the wireless communications system 100 may be a Long Term Evolution (LTE)

network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may include one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

When using a UE that is operating in an RTT mode or a TTY mode, a number of issues may arise. Some issues may occur when switching between the two technologies. For example, a user may be communicating with a second user via a TTY device that is plugged into the cell phone. The user may accidentally unplug the TTY device and the cell phone may switch to a voice call, or the call may be interrupted or be dropped. In another example, TTY devices are supported by packet-switched networks and circuit-switched networks and RTT devices are supported by packet-switched networks. When a user initiates a texting session and is using either one of RTT or TTY and crosses into the other network, the communication may also be interrupted causing an inconvenience to the user.

Seamless transitioning between a TTY mode, an RTT mode, and/or a PS network and a CS network may present some benefits to users with hearing disabilities. In some cases, the interoperability of being able to switch between PS networks and CS networks and between modes may ensure fewer interrupted conversations and convenience to the user of the UE.

In some examples, a texting session may be activated while a UE (for example, a cell phone) operates in either an RTT or a TTY mode. The UE may transmit, via a texting session, first text data to a base station while operating in a first texting mode. At some time, the UE may determine that it may be desirable to perform a mode switch by switching from the first texting mode to a second texting mode. In some cases, a user may plug in a TTY device, and the UE may determine to switch from an RTT mode to a TTY mode. In another example, a user may disconnect a TTY device from the UE, and the UE may determine to switch from a TTY mode to an RTT mode. In another example, a serving base station in a PS network may determine to handover the UE to a CS network that supports a TTY mode, and not an RTT mode. When the UE determines to perform a mode switch, a modem of the UE may receive buffered text data of the texting session and may initiate the second texting mode. The modem of the UE may transmit the receive buffered text data from the first texting mode to the second texting mode, to enable a seamless transition from the first texting mode to the second texting mode. The UE may then transmit, via the texting session, the second text data to the base station while operating in the second texting mode.

Figure 2:
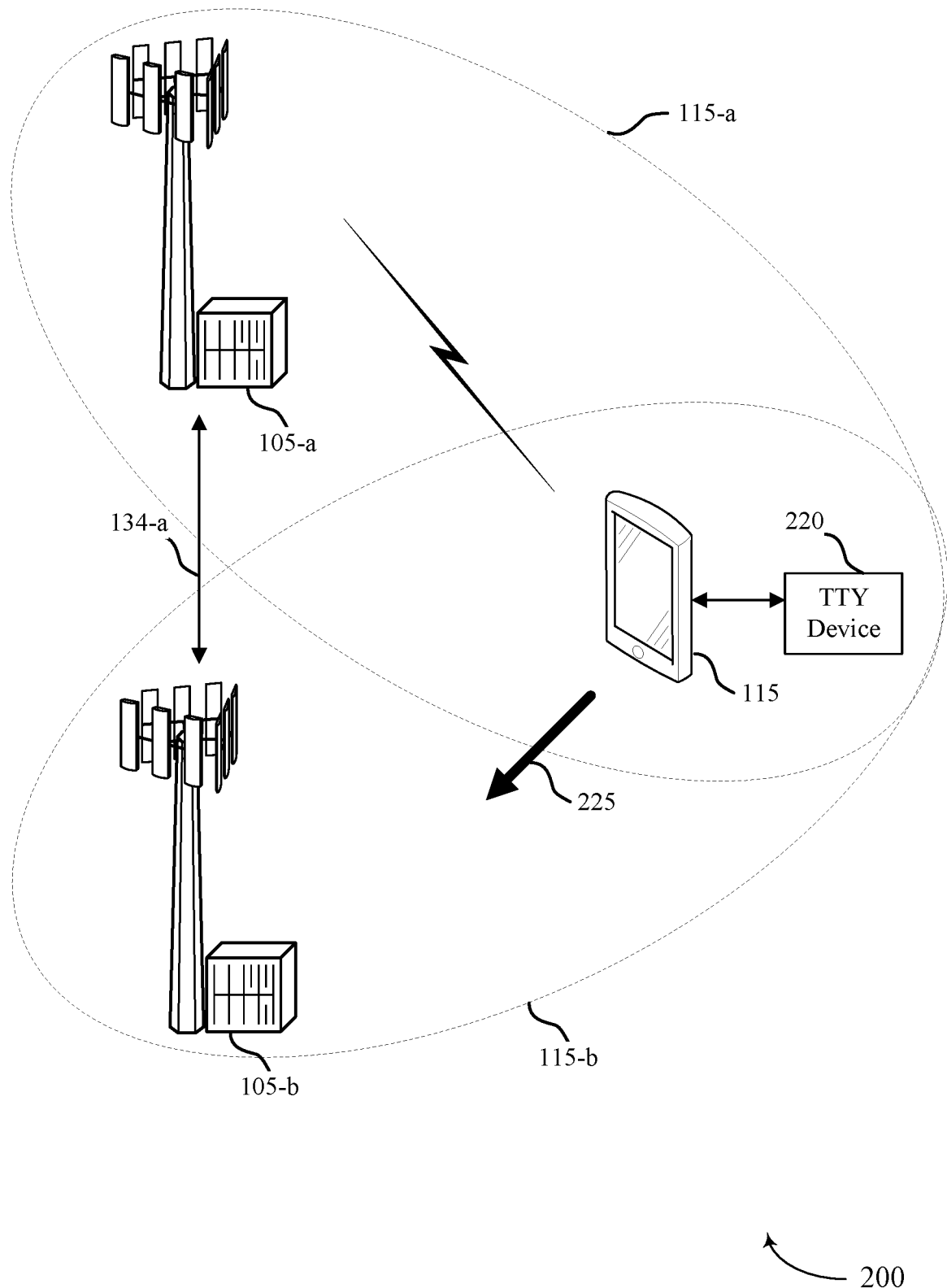
FIG. 2 illustrates an example of a system for wireless communications that supports service continuity of real-time text and teletypewriter modes in accordance with aspects of the present disclosure.

FIG. 2 illustrates an example of a wireless communication subsystem 200 that supports service continuity of real-time text and teletypewriter modes in accordance with various aspects of the present disclosure. In some examples, the wireless communication subsystem 200 may implement aspects of wireless communication subsystem 100. In the example of FIG. 2, the wireless communication subsystem may include a base station 105-*a* and a base station 105-*b*, which may be examples of the base stations 105 of FIG. 1. The wireless communication subsystem 200 may also include a UE 115-*a*, which may be an example of a UE 115 of FIG. 1, that may be located within coverage area 110-*a* of the base station 105-*a* and that may be located within coverage area 110-*b* of the base station 105-*b*.

In the example of FIG. 2, the base station 105-*a* and the UE 115-*a* may be in the same coverage area 110-*a* and may establish a connection for setting up a texting session by which the base station 105-*a* and the UE 115-*a* may exchange text data. The UE 115-*a* may use a first texting mode or a second texting mode for communicating text data via the texting session. As discussed herein, the first texting mode may be an RTT mode or a TTY mode. In some examples, the base station 105-*a* and the base station 105-*b* may have a backhaul link 134-*a*.

In some examples and as illustrated in FIG. 2, a UE 115-*a* may be employing an RTT mode with base station 105-*a* in coverage area 115-*a*. As the UE 115-*a* moves through coverage areas, the UE 115-*a* may travel towards coverage area 115-*b* as depicted by the arrow 225. Coverage area 115-*b* may be a CS network, and the CS network may support selected texting modes which the UE 115-*a* may use. In an example, the CS network will support a TTY mode and will not support an RTT mode. During a handover from the PS to the CS network, the UE may switch from an RTT mode to a TTY mode to maintain the texting session.

In some examples, a texting session may be initiated and text data may be transmitted to the base station 105 while operating in a first mode. For any reason, including those disclosed herein, the UE 115 or user may determine to switch from a first texting mode to a second texting mode. After determining whether to perform a mode switch, the base station 105 may transmit the buffered text data to the modem text interface 310, which may then initiate a second mode. The second mode may be the other of the RTT mode and the TTY mode from the first mode. Then the second mode may transmit second text data to the base station 105.

In some examples, the coverage area 110-*a* may provide LTE coverage to the UE 115-*a*. Generally, UE 115-*a* may be in either a packet-switched mode or a circuit-switched mode and also may be in an RTT or a TTY mode. In this example, the UE 115-*a* may initiate the communication for a user with voice or video in an RTT mode and the UE 115-*a* internet protocol multimedia subsystem (IMS) may be a registered user. After initiating the communication, a TTY device 220 may be plugged into the UE 115-*a*. In order to maintain continuity of service and to not interrupt the communication session, a text buffer, which may be a previous conversation buffer, may be sent to the TTY device 220 so that the user may have appropriate conversation context. For example, the user may have entered some text in the course of the conversation during the communication, and the entered text may be sent as a text buffer to the TTY device so that it may not be lost or deleted while the device switches between an RTT mode and the TTY mode. Additionally, internal to UE 115-*a*, the IMS may switch from RTT to TTY. The ability of a user to plug in or unplug a TTY device at their convenience may provide additional accessibility of use and ease of use.

In some examples, a user may initiate a communication using a TTY device 220, such as a texting session. At some point the user may wish to unplug the TTY device 220 and switch to an RTT mode. The UE may transition from a TTY mode to an RTT mode by requesting that the RTT turn on, and then receiving an indication that the RTT turned on. Additionally, the TTY device may employ text buffers to ensure that no data may be lost in the communication. A user may benefit from the interoperability of the RTT and the TTY device as networks may prefer one mode over the other and this may ensure a consistent and seamless connection.

In some examples, the coverage area 110-*a* may provide LTE coverage to the UE 115-*a*. In this example, the UE 115-*a* may initiate the communication for a user with voice or video in both the RTT mode and the TTY mode. In this example, the UE 115-*a* may move from coverage area 110-*a* to coverage area 110-*b*. In coverage area 110-*b*, the base station 105-*b* may provide circuit-switched coverage so the UE 115-*a* may have to switch from a packet-switched network to a circuit-switched network. In order to maintain continuity of service, the single radio text call continuity (SRTCC) may be employed. When communicating with a voice call or texting session on UE 115-*a* that is switching from a packet-switched network to a circuit-switched network, UE 115-*a* may support single radio voice call continuity (SRVCC). SRVCC may allow the UE 115-*a* to transition from the packet-switched network to the circuit-switched network. When using RTT and TTY, UE 115-*a* may support SRTCC, which may allow the communication session to smoothly transition from the PS network to the CS network.

In some examples, initially, a text session may be established between a UE 115-*a* and the base station 105-*a* using a first texting mode. After establishing the communication, first text data may be transmitted from the UE 115-*a* to the base station 105. The first mode may be either of an RTT mode or a TTY mode.

Figure 3:
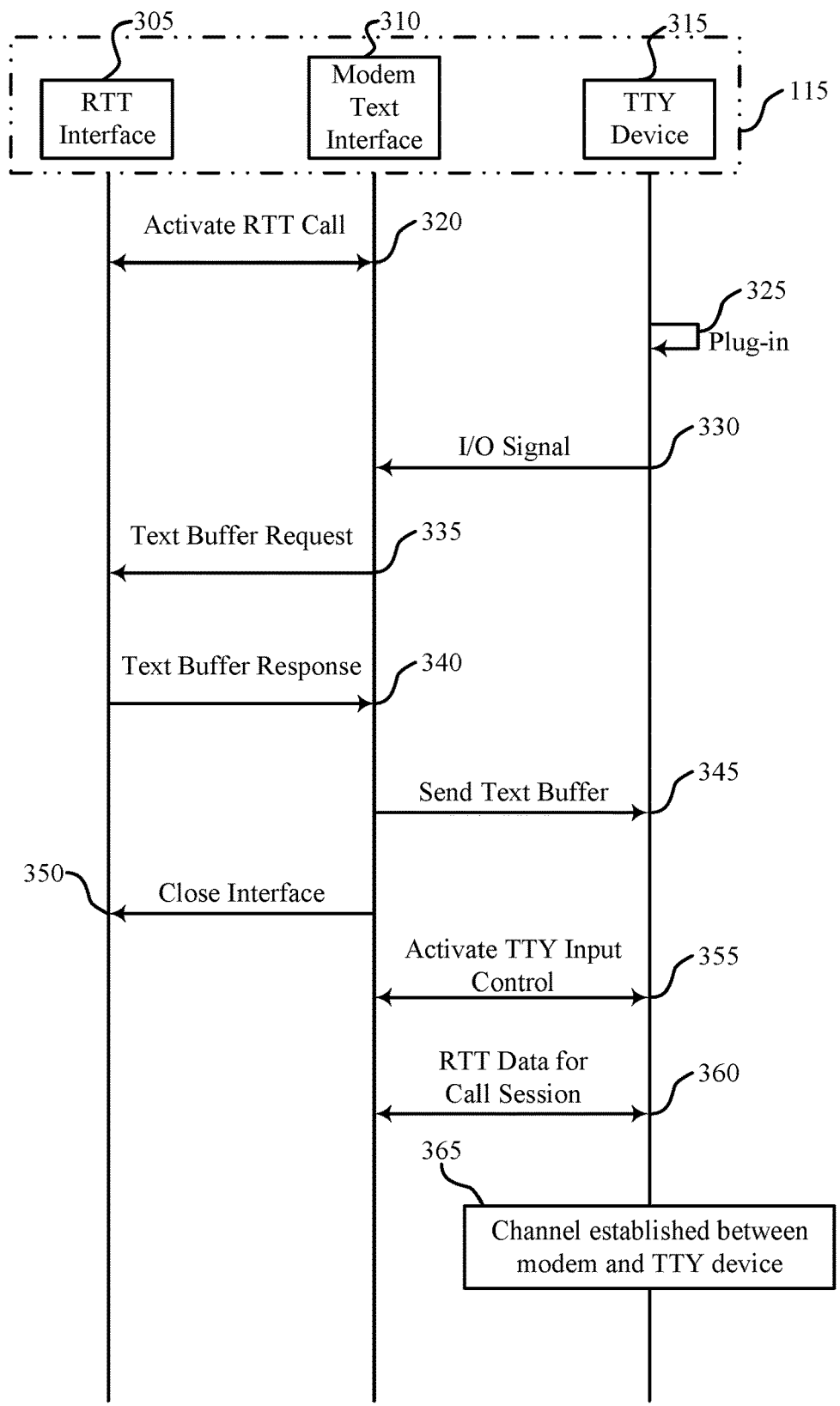
FIG. 3 illustrates an example of a communication scheme that supports service continuity of real-time text and teletypewriter modes in accordance with aspects of the present disclosure.

FIG. 3 illustrates an example of a communication scheme 300 that supports service continuity of real-time text and teletypewriter modes in accordance with aspects of the present disclosure. In some examples, communication scheme 300 may implement aspects of wireless communication system 100. Communication scheme 300 may include the transmission flow of at least activation signals, interface command signals, text data, text buffers, and control signals, between an RTT interface 305, a modem text interface 310, and a TTY device 315. The RTT and TTY modes and devices may be an example of the RTT and TTY devices discussed with respected to FIG. 2. FIG. 3 illustrates a process flow of switching from an RTT mode to a TTY mode.

The UE 115 may include an RTT interface 305, a modem text interface 310, and a TTY device 315. The TTY device 315 may be internal or external to the UE 115-*a*. Additionally, the RTT interface 305 may be installed on a cell phone as software or firmware, or there may be an external RTT device that plugs into the cell phone. The modem text interface 310 may be hardware and/or software included within a modem of the UE 115-*a*. The modem text interface 310 may determine whether to perform a mode switch from operating in a first texting mode to operating in a second texting mode. In some examples, the modem text interface 310 may make this determination based on whether the UE 115-*a* is in a PS network service area or a CS network service area. In some examples, the modem text interface 310 may make this determination based on whether a TTY device 315 is plugged in or whether the user selected the TTY mode or the RTT mode on the UE 115. In some examples, the user may want to switch between modes, thus making it desirable to be able to transition seamlessly between the two modes.

Initially, UE 115 may establish a connection with a base station 105 and at 320, an RTT communication, such as an RTT texting session may be activated between the RTT interface 305 and the modem text interface 310. In the communication of FIG. 3, the connection may be an LTE or any other appropriate PS network. In some examples, the UE 115 may include both the RTT interface 305 and the modem text interface 310. The RTT interface 305 and the modem text interface 310 may be implemented in hardware, software executed by a processor, firmware, or any combination thereof.

After the activation of the RTT texting session (e.g., RTT call) and at 325, a TTY device 315 may be plugged into the UE 115, or the TTY application on the UE 115 may be activated. The TTY device 315 may be external hardware to the UE 115, in which case, the TTY device 315 may be plugged-in to the UE 115 through an interface. Additionally, the TTY device 315 may be internal to the UE 115. For example, the TTY device 315 may be implemented in hardware, software executed by a processor, firmware, or any combination thereof. The TTY device 315 may be an application that may be loaded onto the UE 115 or may be a default application that is internal to the UE 115. In some examples, a circuit switched network may involve plugging in a TTY device for texting. In other examples, large screen mobiles, a keyboard enabled handset, a Bluetooth paired keyboard, or the like, may enable a use to answer and respond to TTY calls without the TTY device itself using screen/built in keyboard or external keyboard. Although the TTY device 315 may be referred to as "plugged-in," this may also include both the examples of the TTY device 315 being external and internal to the UE 115.

At 330, an input/output signal may be transmitted from the TTY device 315 to the UE 115. The UE 115 may receive this transmission at the modem text interface 310. At 320, the UE 115 may detect that the TTY device 315 has been activated by receipt of the I/O signal from the TTY device 315.

At 335, the modem text interface 310 may transmit a signal to the RTT interface 305. The signal may be a text buffer request. This request may be sent to the RTT interface 305 to indicate that any text or data that may be entered may need to be buffered due to the upcoming transition from the RTT mode to the TTY mode. Should the entered text not be buffered, the text may be lost or corrupted during the switch from the RTT mode to the TTY mode.

At 340, the RTT interface 305 may transmit a signal to the modem text interface 310. The transmitted signal may include a text buffer response that includes buffered text data. This signal may be transmitted in response to the received text buffer request. The text buffer response may be a signal that includes the entered text or data. For example, the buffered text data may be buffered text of the texting session via the RTT mode and may include an ongoing text conversation and a historical texts that are part of the ongoing text conversation.

At 345, the modem text interface 310 of the UE 115, may transmit the text buffer to the TTY device 315. Once the text buffer is received at the TTY device 315, the entered data or text may be successfully transmitted to the TTY device 315 even though the entered data or text may be entered on the RTT interface 305. The TTY device 315 may display, for example, historical texts that are part of the ongoing text conversation that were previously entered via the RTT interface 305. Thus, the TTY device 315 may display the ongoing text conversation that previously occurred in the RTT mode, and thereby making the transition from the RTT mode to the TTY mode seamless to the end user.

At 350, the modem text interface 310 may transmit the signal to the RTT interface 305 to close the interface between the modem text interface 310 of the UE 115 and the RTT interface 305. After the RTT interface 305 receives the close interface signal, the UE 115 may transition from the RTT interface 305 to the TTY device 315.

At 355, the TTY input control may be activated between the modem text interface 310 and the TTY device 315. In some examples, the TTY device 315 may be a separate plug-in device than the UE 115, this may allow the user to type in the text or message directly into the TTY device 315. In some examples, the TTY device 315 may be an application that is on the UE 115. This may allow the user to type in the text or the message directly into the UE 115 and may be a seamless transition to the user. That is, the transition from one mode to the other may be seamless to the user and the user may not know that the UE 115 has transitioned from using the RTT mode to the TTY mode.

At 360, the RTT data for the texting session may be transmitted and received between the modem text interface 310 and the TTY device 315. The RTT data may include information such as, control channel information, text history, data channel information, and signal information, and so forth, and any combination thereof. By receiving the RTT data for the text session at the TTY device 315, the ongoing communication may be able to continue unimpeded.

At 365, a communication channel may be established between the modem text interface 310 and the TTY device 315. In an example, the UE 115 may include a bus interconnecting the modem text interface 310 and the TTY device 315, and the modem text interface 310 may perform a handshake procedure with the TTY device 315 to establish a communication channel via the by which text data may be communicated between the modem text interface 310 and the TTY device 315. Since the TTY input control has been activated and the communication channel has been established between the modem text interface 310 and the TTY device 315, the TTY device may now be used for the continued communication. At this point in the procedure for switching from an RTT mode to a TTY mode, the mode switch may be complete. The communication channel may be established between the modem and either one or both of the RTT and TTY devices, depending on the mode of operation. The communication channel may be any type of frequency or spectrum band established to communicate (e.g., transmit and/or receive) signaling between devices, modes, and/or interfaces.

Figure 4:
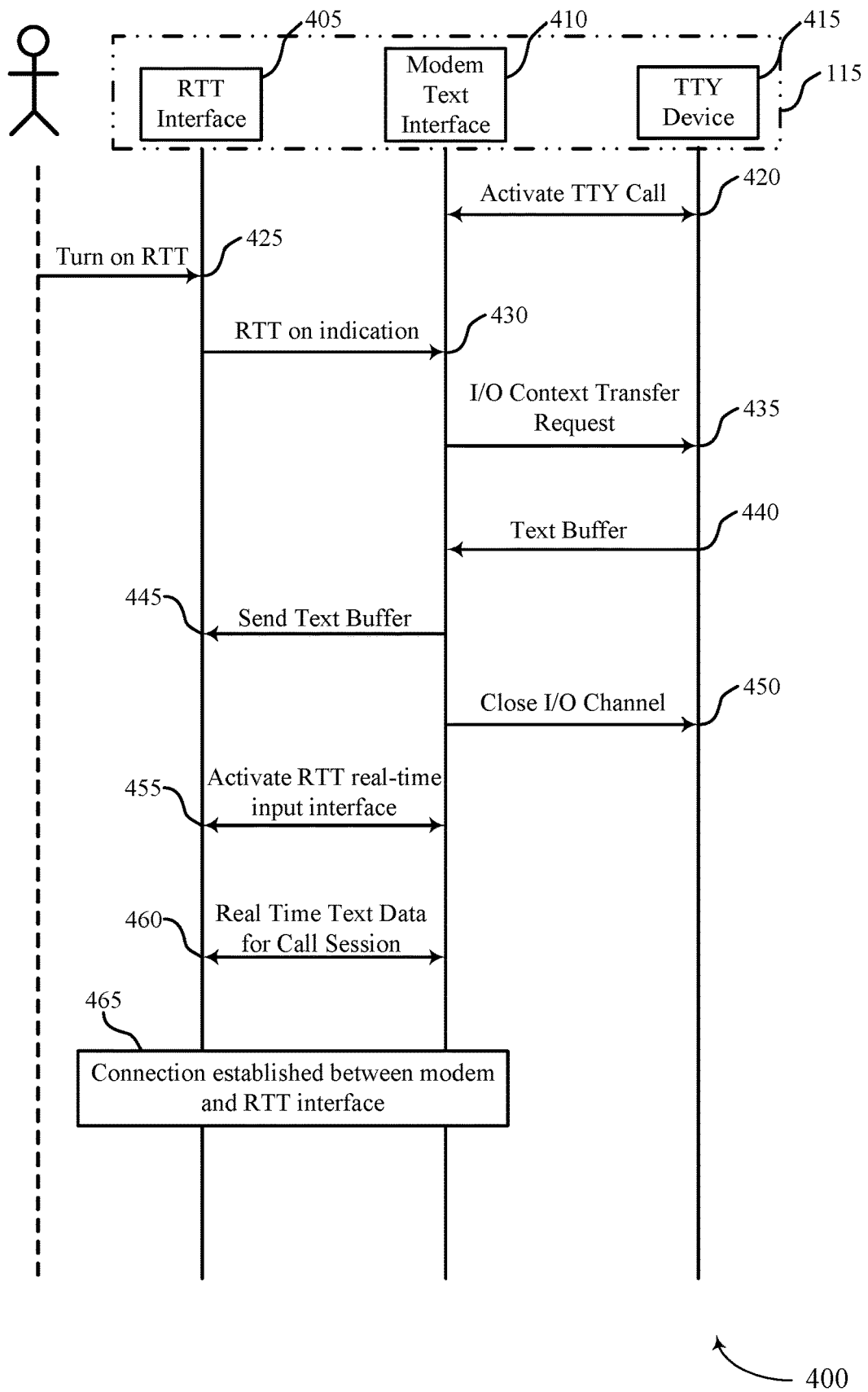
FIG. 4 illustrates an example of a communication scheme that supports service continuity of real-time text and teletypewriter modes in accordance with aspects of the present disclosure.

FIG. 4 illustrates an example of a communication scheme 400 that supports service continuity of real-time text and teletypewriter modes in accordance with aspects of the present disclosure. In some examples, communication scheme 400 may implement aspects of wireless communication system 100. Communication scheme 400 may include the transmission flow of at least activation signals, interface command signals, text data, text buffers, and control signals, between an RTT interface 405, a modem text interface 410, and a TTY device 415. The RTT and TTY modes and devices may be an example of the RTT and TTY devices discussed with respect to FIGS. 2 and 3. FIG. 4 illustrates a process flow of switching from a TTY mode to an RTT mode.

At 420, a TTY text session (e.g., TTY call) may be activated between the TTY device 415 and the modem text interface 410. As previously discussed with respect to FIG. 3, the TTY device 415 may be an external device that may be plugged-in to the UE 115, or may be a software application that is internal to the UE 115. In the communication of FIG. 4, the connection may be an LTE network or any other appropriate PS network. In some examples, the UE 115 may include both the RTT interface 405 and the modem text interface 410. The RTT interface 405 and the modem text interface 410 may be implemented in hardware, software executed by a processor, firmware, or any combination thereof.

At 425, the RTT interface 405 may be turned on at the UE 115. In some examples, the RTT mode may be turned on automatically by the UE 115 as a default setting for the UE 115. In some examples, the RTT mode may be turned on by a user on the UE 115. The RTT mode may be turned on by the user by starting a text session on the UE 115 or the user may turn on a specific RTT mode application that is on the UE 115, before initiating a text session in RTT mode.

At 430, an indication may be transmitted from the RTT interface 405 to the modem text interface 410. The indication to the modem text interface 410 may indicate that the RTT mode has been turned on. The indication may be transmitted to the modem text interface 410 when the UE 115 is turned on, when the user activates the RTT mode on the UE 115, when the user initiates a text session on the UE 115 and the UE 115 is set to an "on" default mode, and so forth, and any combination thereof. After the indication is received at one or both of the UE 115 and the modem text interface 410, the determination to perform a mode switch, to switch from operating in the TTY mode to operating in the RTT mode may be made.

At 435, an I/O context transfer request may be transmitted from the modem text interface 410 to the TTY device 415. The I/O context transfer request may be a text buffer request that is transmitted to the TTY device 415. The I/O context transfer request may request that the TTY device 415 provide buffered text to the modem text interface 410 and may additionally request that the text buffer from the TTY device 415 be formatted and conform to the I/O context. This request may be sent to the TTY device 415 to indicate that any text or data that may be entered may need to be buffered due to the upcoming transition from the TTY mode to the RTT mode. Should the entered text not be buffered, the text may be lost or corrupted during the switch from the TTY mode to the RTT mode. The I/O context may ensure that the communication is uninterrupted even though the mode has switched from a TTY mode to an RTT mode.

At 440, the TTY device 415 may transmit a signal to the modem text interface 410. The transmitted signal may include buffered text data that includes at least the text data entered at the TTY device 415. This signal may be transmitted in response to the received I/O context transfer/text buffer request. The buffered text data that is transmitted to the modem text interface 410 may be a signal that includes the entered text or data of an ongoing text conversation and a historical texts that are part of the ongoing text conversation, similar to the description provided above.

At 445, the modem text interface 410 may transmit a signal to the RTT interface 405. The transmitted signal may include the text buffer as described with respected to transmission 440. The text buffer may be transmitted to the RTT interface to provide context to the user once the mode switches from the TTY mode to the RTT mode. The RTT interface 405 may display, for example, historical texts that are part of the ongoing text conversation that were previously entered via the TTY device 415.

At 450, a signal may be sent from the modem text interface 410 to the TTY device 415 to close a communication channel (e.g., input/output (I/O) channel) between the modem text interface 410 and the UE 115. The communication channel being closed may be a channel previously established, for example via a bus, interconnecting the modem text interface 410 and the TTY device 415, by which data may transported between the modem text interface 410 and the TTY device 415.

At 455, the RTT real-time input interface may be activated between the modem text interface 410 and the RTT interface 405. In some examples, by activating the RTT input interface, the user may type in the text or message directly into the UE 115 or the interface for the RTT mode on the UE 115. This may make the transition from one mode to the other, seamless to the user and the user may not know that the UE 115 has transitioned from using the TTY mode to the RTT mode.

At 460, the RTT data for the text session may be transmitted and received between the modem text interface 410 and the RTT interface 405. The RTT data may include information such as, text history, control channel information, data channel information, signal information, and so forth, and any combination thereof. By receiving the RTT data for the text session at the RTT interface 405, the ongoing communication may be able to continue unimpeded.

At 465, a channel may be established between the modem text interface 410 and the RTT interface 405. Since the RTT interface input control has been activated and the channel has been established between the modem text interface 410 and the RTT interface 405, the RTT interface 405 may now be used for the continued communication. At this point in the procedure for switching from a TTY mode to an RTT mode, the mode switch may be complete.

Figure 5:
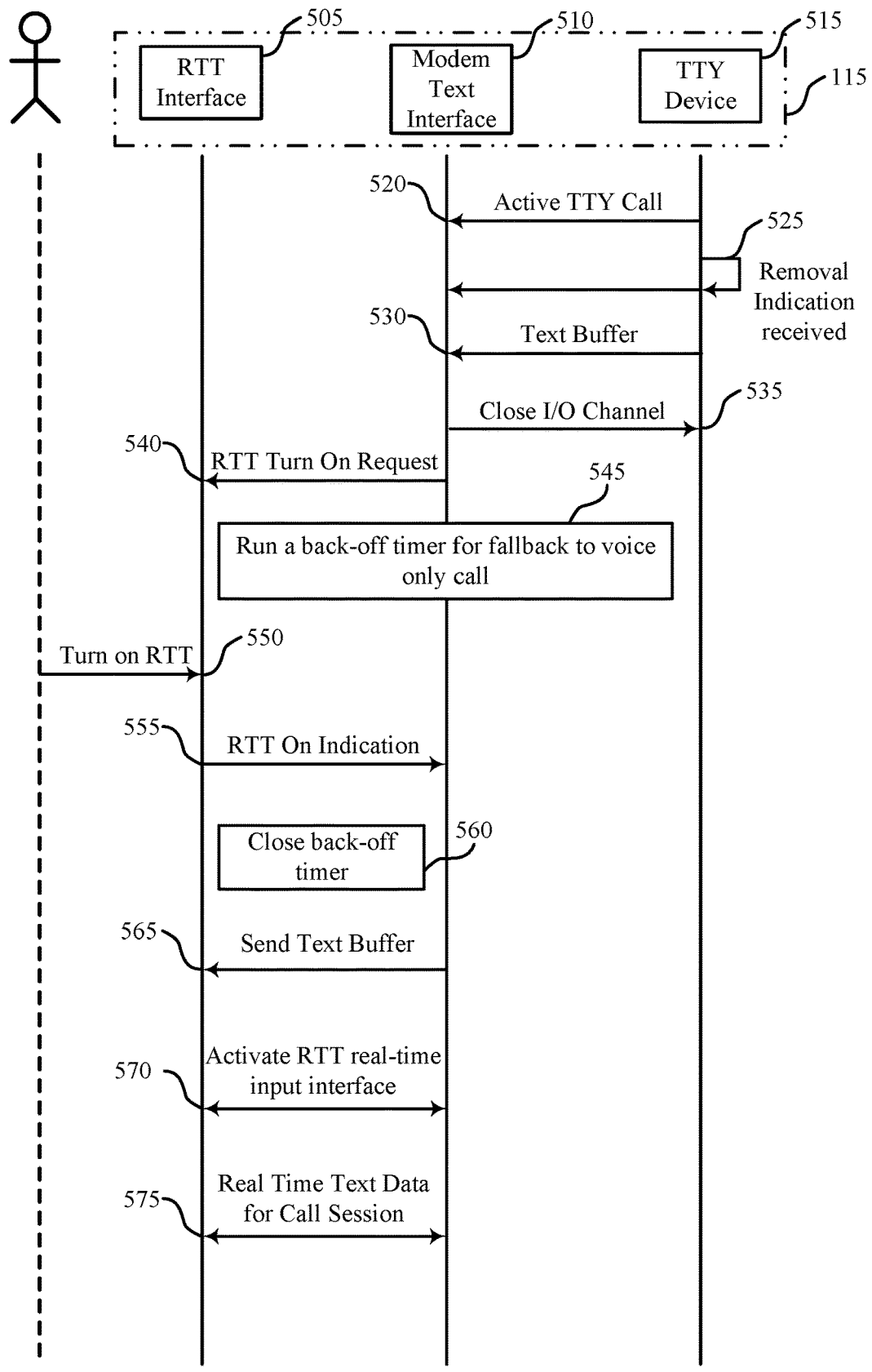
FIG. 5 illustrates an example of a communication scheme that supports service continuity of real-time text and teletypewriter modes in accordance with aspects of the present disclosure.

FIG. 5 illustrates an example of a communication scheme 500 that supports service continuity of real-time text and teletypewriter modes in accordance with aspects of the present disclosure. In some examples, communication scheme 500 may implement aspects of wireless communication system 100. Communication scheme 500 may include the transmission flow of at least activation signals, interface command signals, text data, text buffers, and control signals, between an RTT interface 505, a modem text interface 510, and a TTY device 515. The RTT and TTY modes and devices may be an example of the RTT and TTY devices discussed with respected to FIGS. 2, 3, and 4. FIG. 5 illustrates a process flow of switching from a TTY mode to an RTT mode in the event that the TTY device 515 is removed from the UE 115.

At 520, a TTY text session (e.g., TTY call) may be activated between the TTY device 515 and the modem text interface 510. As previously discussed with respect to FIG. 5, the TTY device 515 may be an external device that may be plugged-in to the UE 115, or may be a software application that is internal to the UE 115. In the communication of FIG. 5, the connection may be an LTE or any other appropriate PS network. In some examples, the UE 115 may include both the RTT interface 505 and the modem text interface 510. The RTT interface 505 and the modem text interface 510 may be implemented in hardware, software executed by a processor, firmware, or any combination thereof.

At 525, an indication that the TTY device has become unplugged may be received at the UE 115 and/or the modem text interface of the UE 115. In some examples, the TTY device may be an external device that plugs into the UE 115. In FIG. 5, the TTY may be unplugged so that the user of the UE 115 may use the RTT interface 505, or the TTY device 515 may be inadvertently and accidentally unplugged from the UE 115. After the TTY device has become unplugged and the indication is received at one or both of the UE 115 and the modem text interface 510, the determination to perform a mode switch, to switch from operating in the TTY mode to operating in the RTT mode may be made.

At 530, a signal may be transmitted from the TTY device 515 to the modem text interface 510. The transmitted signal may include buffered text data that includes at least the entered data on the TTY device 515 before being unplugged. The buffered text data that is transmitted to the modem text interface 510 may be a signal that includes the entered text or data to ensure that the entered data is not corrupted or lost during the switch between the modes. The RTT interface 505 may display, for example, historical texts that are part of the ongoing text conversation that were previously entered via the TTY device 515.

At 535, a signal may be sent from the modem text interface 510 to the TTY device 515. The transmitted signal may close the I/O channel between the modem text interface 510 and the TTY device 515.

At 540, a signal may be sent from the modem text interface 510 to the RTT interface 505. The transmitted signal may be a request to turn on the RTT interface. This signal may be sent based on the modem text interface 510 receiving the indication that the TTY device 515 may have been removed, the text buffer, and may be also based on the modem text interface 510 closing the I/O channel with the TTY device 515.

At 545, the modem text interface 510 of the UE 115, may start and run a back-off timer. The back-off timer may be a safety measure. The safety measure may be based on the time between the turn on request sent to the RTT interface 505 and receiving the indication from the RTT interface 505 that the RTT interface has been turned on. In some examples, the time may exceed a threshold time and the communication may be transferred over to a voice only call, as opposed to an RTT mode text session to prevent the communication from being inadvertently terminated. In some examples, the time may be below a threshold time and the communication may successfully transfer from the TTY device 515 to the RTT interface 505 and the communication will remain uninterrupted.

At 550, a user that initiated the communication on the TTY device 515, may turn on the RTT interface 550. In some examples, the user may toggle the RTT interface on, using an interface on the UE 115. In some examples, the RTT interface may be automatically activated by the UE 115 and/or RTT interface 505. After the RTT interface 505 has been turned on, at 555, an indication that the RTT has been turned on may be transmitted from the RTT interface 505 to the modem text interface 510.

At 560, the back-off timer may be closed. As previously discussed at 545, the back-off time may be a safety measure to ensure that the communication is not interrupted. Should the time elapsed between the request to turn on the RTT interface 505 and the receipt of the indicator that the RTT interface 505 has been turned on, be below a threshold time, the back-off timer may be closed by the UE 115 and/or the modem text interface 510.

At 565, the modem text interface 510 may transmit a signal to the RTT interface 505. The transmitted signal may include the text buffer as described with respected to transmission 540 in FIG. 5. The text buffer may be transmitted to the RTT interface 505 to provide context to the user once the mode switches from the TTY mode to the RTT mode.

At 570, the RTT real-time input interface may be activated between the modem text interface 510 and the RTT interface 505. In some examples, by activating the RTT input interface, the user may type in the text or message directly into the UE 115 or the interface for the RTT mode on the UE 115. This may make the transition from one mode to the other, seamless to the user and the user may not know that the UE 115 has transitioned from using the TTY mode to the RTT mode.

At 575, the RTT data for the text session may be transmitted and received between the modem text interface 510 and the RTT interface 505. The RTT data may include information such as, control channel information, data channel information, signal information, and so forth, and any combination thereof. By receiving the RTT data for the text session at the RTT interface 505, the ongoing communication may be able to continue unimpeded.

Figure 6:
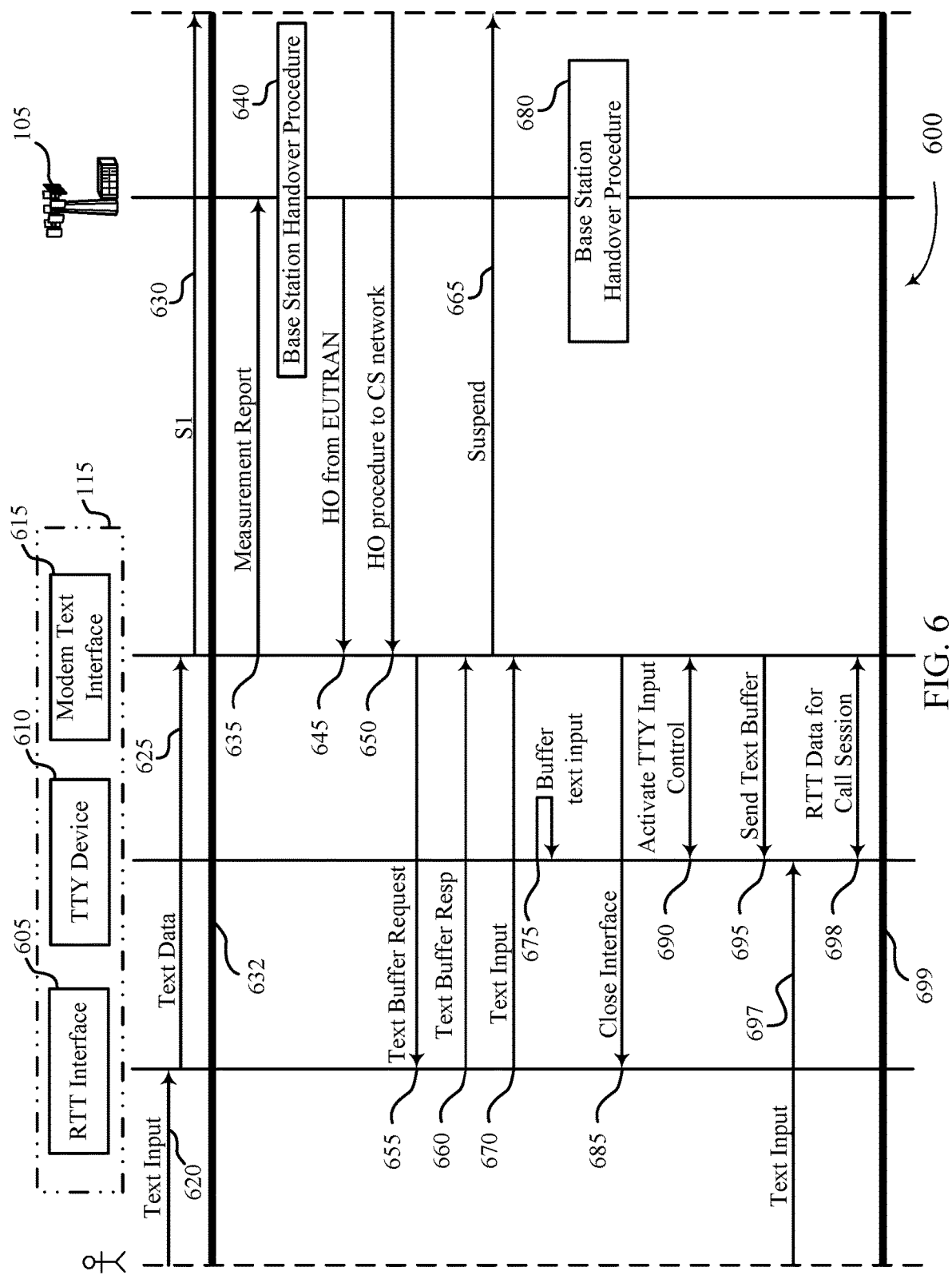
FIG. 6 illustrates an example of a communication scheme that supports service continuity of real-time text and teletypewriter modes in accordance with aspects of the present disclosure.

FIG. 6 illustrates an example of a communication scheme 600 that supports service continuity of real-time text and teletypewriter modes in accordance with aspects of the present disclosure. In some examples, communication scheme 600 may implement aspects of wireless communication system 100. Communication scheme 600 may include the transmission flow of at least activation signals, interface command signals, text data, text buffers, and control signals, between an RTT interface 605, a TTY device 610, and a modem text interface 615. As illustrated in FIG. 6, a UE 115 may include the RTT interface 605, the modem text interface 615, and the TTY device 610. The RTT and TTY modes and devices may be an example of the RTT and TTY devices discussed with respected to FIGS. 2, 3, 4, and 5.

FIG. 6 illustrates a process flow of switching from a PS network to a CS network and accordingly, from an RTT mode to a TTY mode. In some examples, CS networks will support a TTY mode, but will not support an RTT mode. In FIG. 6, the process flow illustrates a UE 115 that starts a communication using an RTT mode and a PS network, and switches to a CS network and accordingly, switches to a TTY mode.

Initially and after starting a texting session, a user may enter text input 620 into a UE 115. The UE may employ an RTT mode, which may be a first texting mode, and accordingly, an RTT interface 605. At 625, the entered text data may be transmitted from the RTT interface 605 to the modem text interface 615. The modem text interface 615 may transmit the text data via an S1 release procedure to a mobility management entity (MME) of base station network operations (not shown in FIG. 6) at 630.

In FIG. 6, the base station network operations are depicted as a dotted line and will be discussed in further detail herein and in the discussion of FIG. 7. In some examples, after the S1 release procedure, the MME may transmit the text data via an S11 reference point interface to a serving gateway (S-GW). The S-GW may then transmit the information via an S5/S8 interface to the public data network gateway (P-DN), which may then transmit the text data via an SG interface to the session border controller (SBC). The SBC may transmit the RTT data to the multimedia resource function (MRFP) which may then transmit it to the IP multimedia subsystem media gateway. (IMS-MGW). At 632, the RTT mode PS network may be connected.

At 635, a measurement report may be transmitted from the modem text interface 615 of the UE 115, to the base station 105. The measurement report may include signal information including, but not limited to, signal strength, power allocation, interference information, channel information, and so forth, and any combination thereof. At 640, a base station handover procedure may take place that will be discussed in detail herein and in the discussion of FIG. 7.

At 645, the base station 105 may transmit a handover command from the evolved universal mobile telecommunications system terrestrial radio access network (E-UTRAN) to the UE 115. Next, at 650, the base station subsystem (BSS) (not shown in FIG. 6), may perform a handover procedure with the CS network, to the modem text interface 615. The handover procedure to the CS network, may include information regarding the transition from the PS network to the CS network. The BSS will be discussed in further detail herein and in the discussion of FIG. 7.

Similar to the discussion of switching from the RTT mode to the TTY mode in FIG. 3, at 655, a text buffer request may be transmitted from the modem text interface 615 to the RTT interface 605. This request may be sent to the RTT interface 605 to indicate that any text or data that may be entered may need to be buffered due to the upcoming transition from the RTT mode to the TTY mode (where the TTY mode is a second texting mode). Should the entered text not be buff-ered, the text may be lost or corrupted during the switch from the RTT mode to the TTY mode.

At 660, the RTT interface 605 may transmit a signal to the modem text interface 615. The transmitted signal may include a text buffer response with data. This signal may be transmitted in response to the received text buffer request and may be a signal that includes the entered text or data. Then at 665, a suspend signal may be transmitted from the modem text interface 615 to the BSS.

At 670, the text input may be transmitted from the RTT interface 605 to the modem text interface 615. Because the UE 115 is in the process of switching between the two modes, the text input may be buffered at the TTY device 610 as illustrated at 675. Next at 680, another series of handover procedures on the base station network side may take place and the PS network to CS network handover may be complete. The base station network side process will be discussed in further detail in the discussion of FIG. 7.

At 685, the modem text interface 615 may transmit the signal to the RTT interface 605 to close the interface between the modem text interface 615 of the UE 115 and the RTT interface 605. After the RTT interface 605 receives the close interface signal, the UE 115 may transition from the RTT interface 605 to the TTY device 610.

At 690, the TTY input control may be activated between the modem text interface 615 and the TTY device 610. In some examples, the TTY device 610 may be a separate plug-in device than the UE 115, this may allow the user to type in the text or message directly into the TTY device 610.

At 695, the modem text interface 615 of the UE 115, may transmit the buffered text data to the TTY device 610. Once the buffered text data is received at the TTY device 610, the entered data or text may be successfully transmitted to the TTY device 610 even though the entered data or text may be entered on the RTT interface 605. The TTY device 610 may display, for example, historical texts that are part of the ongoing text conversation that were previously entered via the RTT interface 305. Based on the text buffer being received at the TTY device 610, a user may enter text input at 697 on the TTY device.

At 698, the RTT data for the text session may be transmitted and received between the modem text interface 615 and the TTY device 610. The RTT data may include information such as, control channel information, data channel information, and signal information, text history, and so forth, and any combination thereof. By receiving the RTT data for the text session at the TTY device 610, the ongoing communication may be able to continue unimpeded. After the RTT data for text session and at 699, the TTY mode CS network may be connected.

Figure 7:
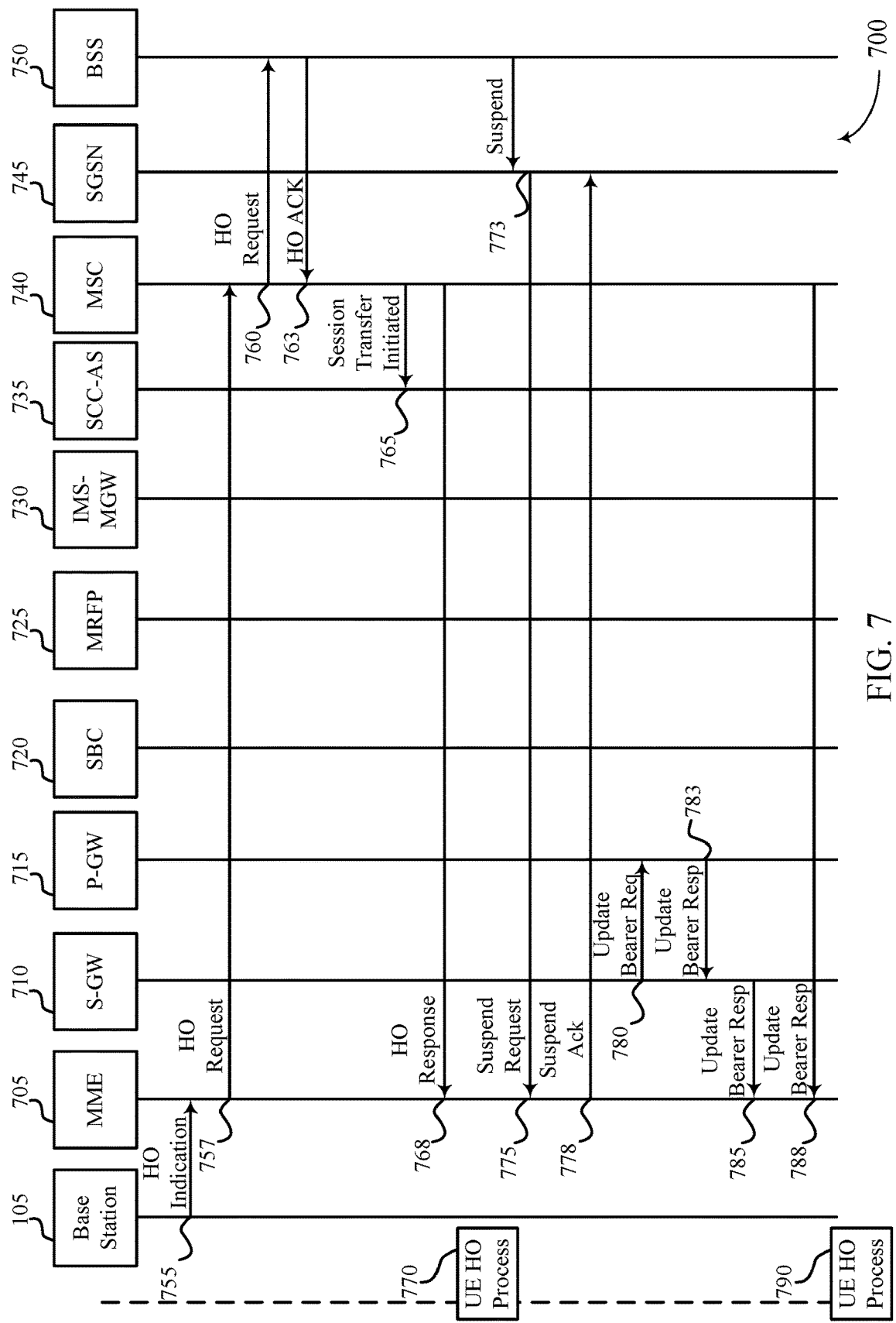
FIG. 7 illustrates an example of a communication scheme that supports service continuity of real-time text and teletypewriter modes in accordance with aspects of the present disclosure.

FIG. 7 illustrates an example of a communication scheme 700 that supports service continuity of real-time text and teletypewriter modes in accordance with aspects of the present disclosure. In some examples, communication scheme 700 may implement aspects of wireless communication system 100. Communication scheme 700 may include the transmission flow of at least activation signals, interface command signals, text data, text buffers, and control signals, between different entities of a base station network. As illustrated in FIG. 7, the BS 105 may be an example of the BSs discussed with respect to FIGS. 2, 3, 4, 5, and 6.

FIG. 7 illustrates a process flow of switching from a PS network to a CS network and accordingly, from an RTT mode to a TTY mode. In some examples, CS networks will support a TTY mode, but will not support an RTT mode. Additionally, the handover procedure steps of FIG. 7 before the UE handover process 770 were referred to in FIG. 6 as base station handover procedure 640. The handover procedure steps of FIG. 7 after the UE handover process 770 were referred to in FIG. 6 as the base station handover procedure 680.

At 775 a handover indication may be transmitted from base station 105 to MME 705, and the MME 705 may then transmit a handover request to mobile switching center (MSC) 740 at 757. MSC 740 may then transmit the handover request to the BSS 750 at 760. After the BSS 750 successfully receives the handover request from MSC 740, the BSS 750 may transmit a handover acknowledgement back to the MSC 740 at 763. As a result, the MSC 740 may transmit a signal indicating to the service centralization and continuity application server 735 (SCC-AS) that the session transfer has been initiated at 765. After the session transfer has been initiated, the handover response may be transmitted from MSC 740 to MME 705 at 768.

As previously discussed, UE handover process 770 is described with respect to FIG. 6. After the UE completes a portion of switching from an RTT mode to the TTY mode, the BSS 750 may the transmit a suspend signal to the serving GSN 745 (SGSN) at 773. The suspend request may be transmitted from the SGSN 745 to the MME 705 at 775. After MME 705 successfully receives the suspend request, MME 705 may transmit a suspend acknowledgement signal to the SGSN 745.

At 780, an update bearer request signal may be transmitted from the serving gateway 710 (S-GW) to PDN gateway 715 (P-GW). P-GW 715 may transmit an update bearer response back to the S-GW 710 at 783. The update bearer response may be transferred from S-GW 710 to MME 705 at 785. MME 705 may additionally receive an update bearer response from MSC 740 at 788. At 790, the rest of the handover process may be completed as discussed with respect to FIG. 6.

Figure 8:
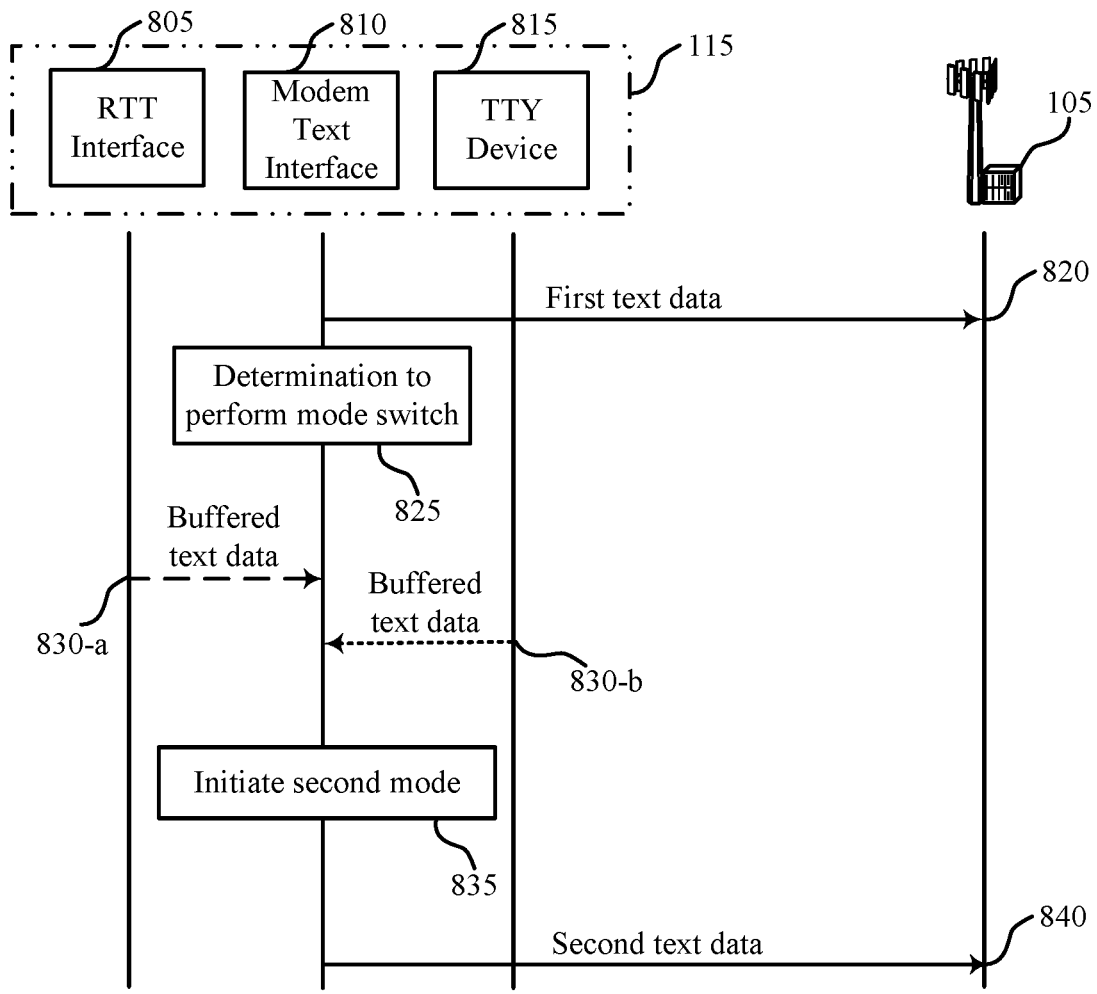
FIG. 8 illustrates an example of a communication scheme that supports service continuity of real-time text and teletypewriter modes in accordance with aspects of the present disclosure.

FIG. 8 illustrates an example of a communication scheme 800 that supports service continuity of real-time text and teletypewriter modes in accordance with aspects of the present disclosure. In some examples, communication scheme 800 may implement aspects of wireless communication system 100. Communication scheme 800 may include the transmission flow of at least activation signals, interface command signals, text data, text buffers, and control signals, between the RTT interface 805, a modem text interface 810, and a TTY device 815. As illustrated in FIG. 8, a UE 115 may include the RTT interface 805, the modem text interface 810, and the TTY device 815. The RTT and TTY modes and devices, may be an example of the RTT and TTY devices discussed with respected to FIGS. 2, 3, 4, 5, 6, and 7. The base station 105-a may be an example of a base station 105 of FIG. 1 and base station 105-a of FIG. 2. The base station 105-a may establish a connection with each of the RTT interface 805 and the TTY device 815.

At 820, the modem text interface 810 of UE 115 may transmit first text data to the base station 105. Initially, a text session may be established between a UE 115 and the base station 105 in a first mode. In some examples, the first mode may be an RTT mode, and the modem text interface 810 may receive the first text data from an RTT interface 805, and relay the first text data to the base station 105. In some examples, the first mode may be a TTY mode, and the modem text interface 810 may receive the first text data from TTY device 815, and relay the first text data to the base station 105.

At 825, the modem text interface 810 may determine whether to perform a mode switch from operating in a first texting mode to operating in a second texting mode. In some examples, the modem text interface 810 may make this determination based on whether the UE 115 is a PS network service area or a CS network service area. In some examples, the modem text interface 810 may make this determination based on whether a TTY device is plugged in or whether the user selected the TTY mode or the RTT mode on the UE 115.

At 830, the modem text interface 810 may receive the buffered text data to the modem text interface 810 of the UE 115. In a first example, when the first mode is the RTT mode, the modem text interface 810 may receive, at 830-a, the buffered text data from the RTT interface 805. In a second example, when the first mode is the TTY mode, the modem text interface 810 may receive, at 830-b, the buffered text data from the TTY device 815.

At 835, the modem text interface 810 may initiate the second mode. In a first example, when the first mode is the RTT mode, the modem text interface 810 may initiate the TTY mode and may pass the buffered text data received from the RTT Interface 805 to the TTY device 815. In a second example, when the first mode is the TTY mode, the modem text interface 810 may initiate the RTT mode, and may pass the buffered text data received from the TTY device 815 to the RTT Interface 805. After the second mode has been initiated, the modem text interface 810 may transmit second text data to the base station 105 at 840. In a first example, when the second mode is the RTT mode, the modem text interface 810 may relay RTT text data between the RTT interface 805 and the base station 105. In a second example, when the second mode is the TTY mode, the modem text interface 810 may relay TTY text data between the TTY device 815 and the base station 105.

Figure 9:
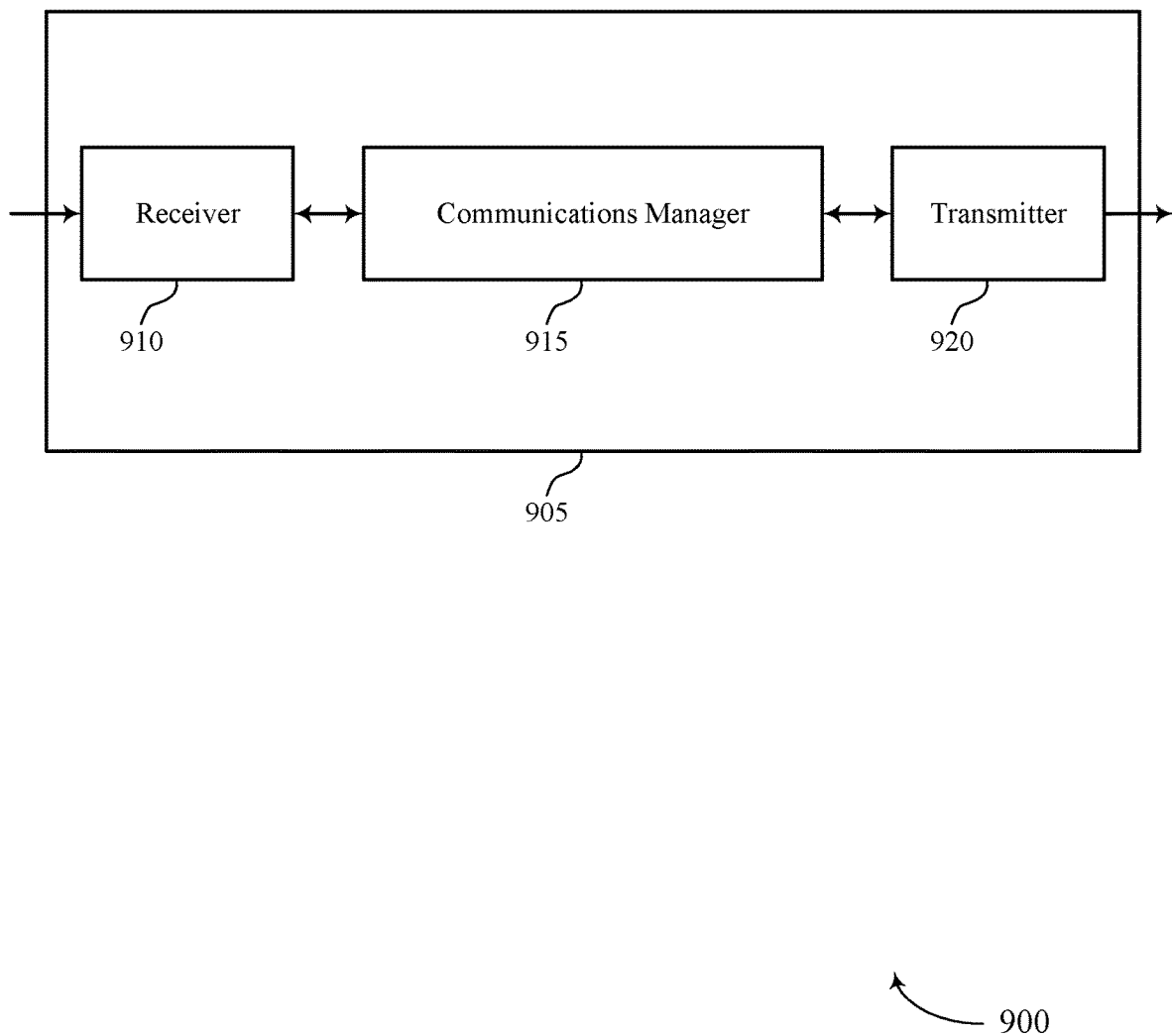
FIGS. 9 and 10 show block diagrams of devices that support service continuity of real-time text and teletypewriter modes in accordance with aspects of the present disclosure.

FIG. 9 shows a block diagram 900 of a device 905 that supports service continuity of real-time text and teletypewriter modes in accordance with aspects of the present disclosure. The device 905 may be an example of aspects of a UE 115 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to service continuity of real-time text and teletypewriter modes, etc.). Information may be passed on to other components of the device 905. The receiver 910 may be an example of aspects of the transceiver 1220 described with reference to FIG. 11. The receiver 910 may utilize a single antenna or a set of antennas.

The communications manager 915 may transmit, via a texting session, first text data to a base station while operating in a first texting mode, transmit, via the texting session, second text data to the base station while operating in the second texting mode, determine to perform a mode switch to switch from operating in the first texting mode to operating in a second texting mode, receive buffered text data of the texting session, and initiate the second texting mode based on receiving the buffered text data and determining to perform the mode switch. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
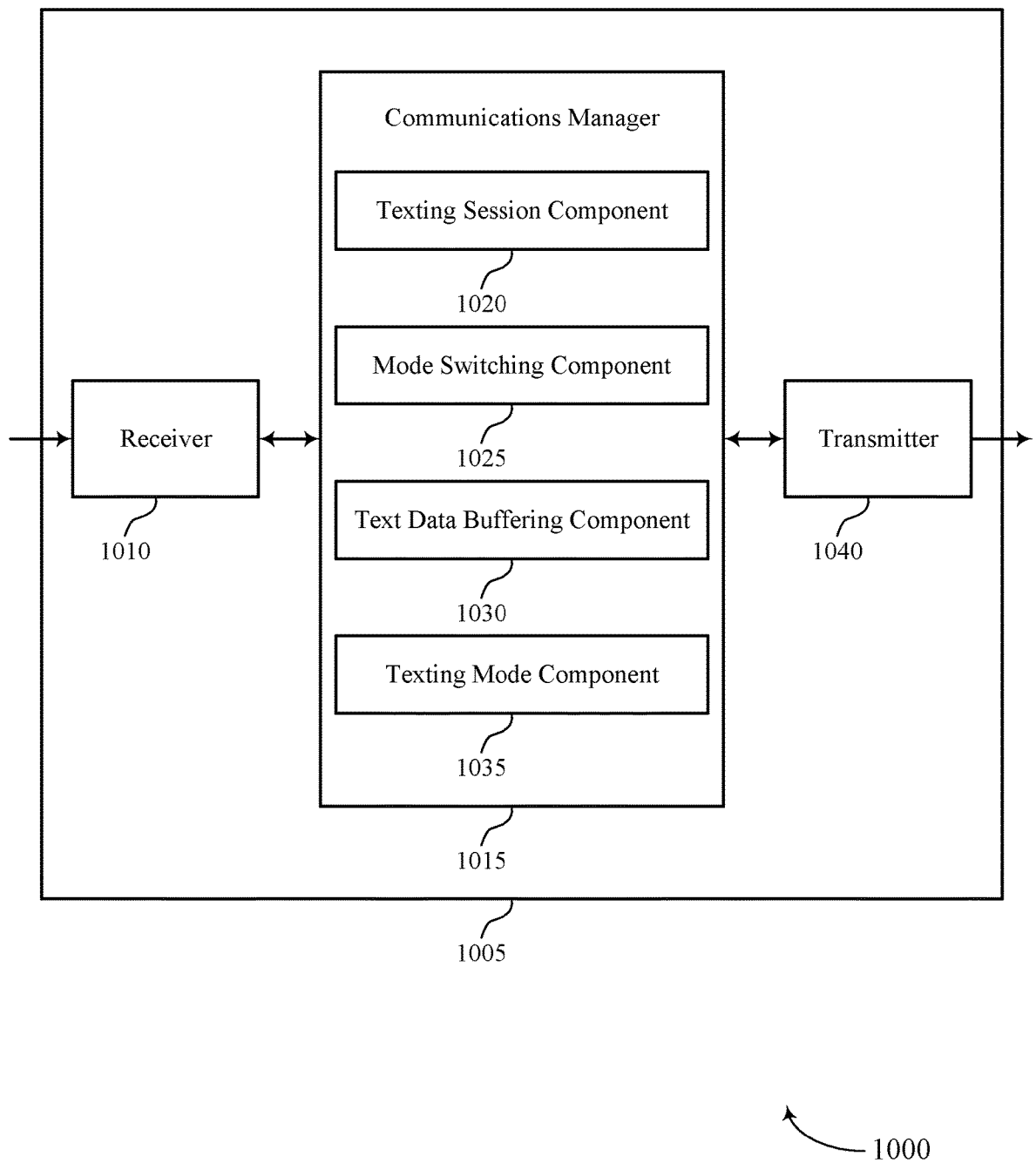

FIG. 10 shows a block diagram 1000 of a device 1005 that supports service continuity of real-time text and teletypewriter modes in accordance with aspects of the present disclosure. The device 1005 may be an example of aspects of a device 905, or a UE 115 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to service continuity of real-time text and teletypewriter modes, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a texting session component 1020, a mode switching component 1025, a text data buffering component 1030, and a texting mode component 1035. The communications manager 1015 may be an example of aspects of the communications manager 1210 described herein.

The texting session component 1020 may transmit, via a texting session, first text data to a base station while operating in a first texting mode and transmit, via the texting session, second text data to the base station while operating in the second texting mode.

The mode switching component 1025 may determine to perform a mode switch to switch from operating in the first texting mode to operating in a second texting mode.

The text data buffering component 1030 may receive buffered text data of the texting session.

The texting mode component 1035 may initiate the second texting mode based on receiving the buffered text data and determining to perform the mode switch.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
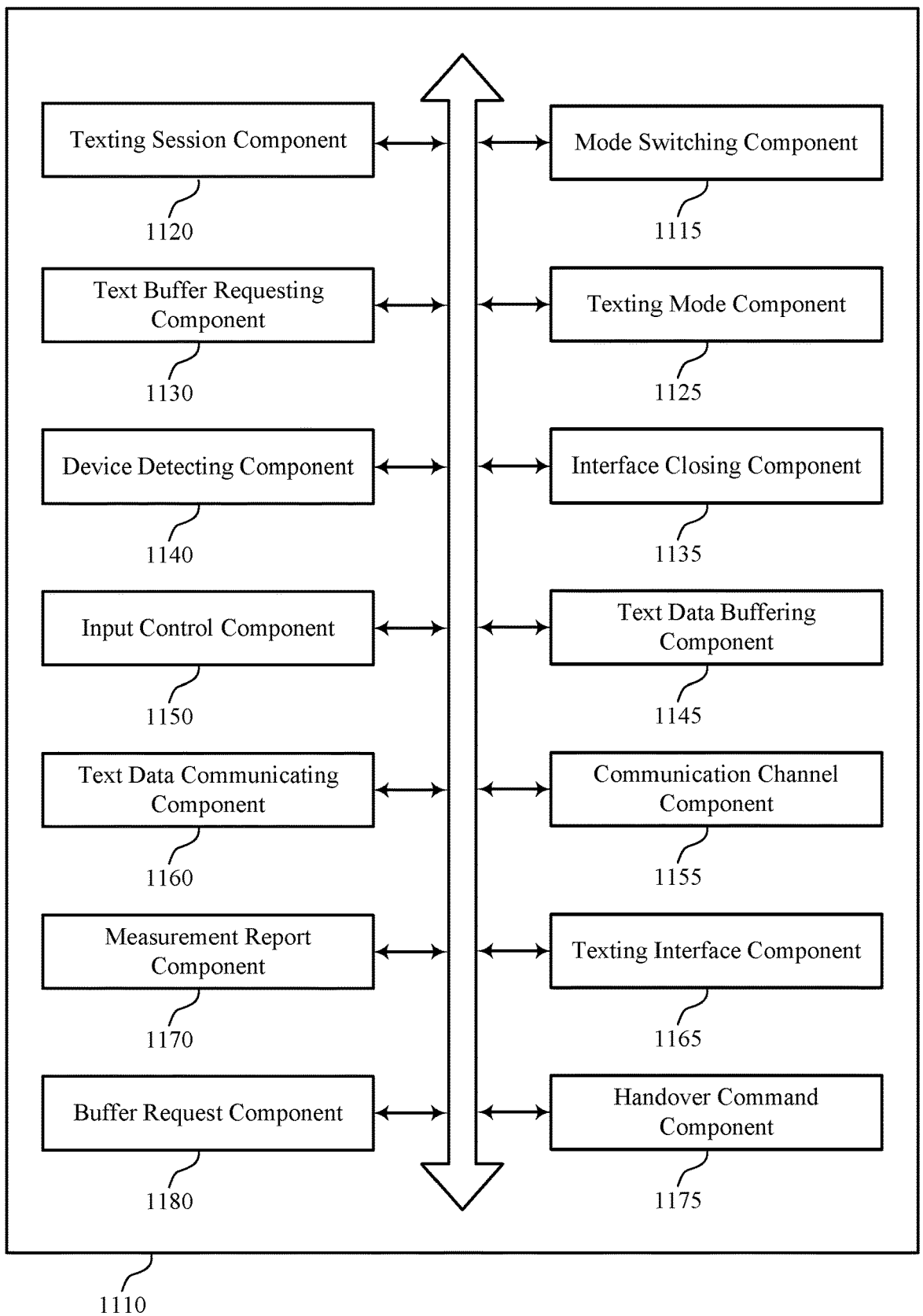
FIG. 11 shows a block diagram of a communications manager that supports service continuity of real-time text and teletypewriter modes in accordance with aspects of the present disclosure.

FIG. 11 shows a block diagram 1100 of a communications manager 1110 that supports service continuity of real-time text and teletypewriter modes in accordance with aspects of the present disclosure. The communications manager 1110 may be an example of aspects of a communications manager 915, or a communications manager 1015 described herein. The communications manager 1110 may include a texting session component 1120, a mode switching component 1115, a text buffer requesting component 1120, a texting mode component 1125, a text buffer requesting component 1130, an interface closing component 1135, a device detecting component 1140, a text data buffering component 1145, an input control component 1150, a communication channel component 1155, a texting interface component 1160, a measurement report component 1165, a handover command component 1170, a buffer request component 1175, and a text data communicating component 1180. Each of these modules may communicate, directly or indirectly, with one another (e.g., via one or more buses).

The texting session component 1120 may transmit, via a texting session, first text data to a base station while operating in a first texting mode. In some examples, the texting session component 1120 may transmit, via the texting session, second text data to the base station while operating in the second texting mode. In some examples, the texting session component 1120 may transmit a suspend command for indicating to a circuit switched network to suspend the text session during the mode switch based on receiving the buffered text data.

The mode switching component 1115 may determine to perform a mode switch to switch from operating in the first texting mode to operating in a second texting mode. In some examples, the mode switching component 1115 may determine to perform the mode switch based on receiving the handover command.

The text buffer requesting component 1120 may receive buffered text data of the texting session. In some examples, the text buffer requesting component 1120 may receive the buffered text data from a teletypewriter (TTY) device, where the first texting mode is a TTY mode. In some examples, the text buffer requesting component 1120 may transmit the buffered text data to the RTT interface for activating an RTT interface. In some examples, the text buffer requesting component 1120 may transmit a text buffer request to a teletypewriter (TTY) device based on the indication. In some examples, the text buffer requesting component 1120 may receive the buffered text data based on the text buffer request. In some examples, the text buffer requesting component 1120 may transmit the buffered text data to a teletypewriter (TTY) device. The texting mode component 1125 may initiate the second texting mode based on receiving the buffered text data and determining to perform the mode switch. In some examples, the texting mode component 1125 may transmit an initial real-time text (RTT) mode request to an RTT interface for initiating an RTT mode, where the second texting mode is the RTT mode.

In some examples, the texting mode component 1125 may initiate a back-off timer for a fallback voice call based on transmitting the initiate RTT mode request. In some examples, the texting mode component 1125 may terminate the back-off timer based on receiving an indication that the RTT mode has been initiated. In some examples, the texting mode component 1125 may communicate, in accordance with the RTT mode, the second text data between the modem and the RTT interface. In some examples, the texting mode component 1125 may receive an indication that the RTT mode has been initiated, where the second texting mode is the RTT mode. In some cases, the first texting mode is one of a teletypewriter (TTY) mode and a real-time text (RTT) mode and the second texting mode is the other of the TTY mode and the RTT mode. The text buffer requesting component 1130 may transmit a text buffer request to a real-time text (RTT) interface based on determining to perform the mode switch, where the first texting mode is an RTT mode.

The interface closing component 1135 may initiate closing of the RTT interface based on receiving the buffered text data.

The device detecting component 1140 may detect that a teletypewriter (TTY) device has been connected to the UE. Additionally, after detecting that the TTY device has been connected, the device detecting component may receive a signal from the TTY device. In some examples, the device detecting component 1140 may detect that the TTY device has been disconnected from the UE.

The text data buffering component 1145 may transmit the buffered text data to the TTY device and the input control component 1150 may activate an input control associated with the TTY device.

Additionally, the communication channel component 1155 may establish a communication channel between a modem of the UE and the TTY device. In some examples, the communication channel component 1155 may close a communication channel between a modem of the UE and the TTY device to terminate the first texting mode. In some examples, the communication channel component 1155 may close a communication channel between a modem of the UE and the TTY device based on receiving the buffered text data.

The texting interface component 1160 may transmit a request to activate an RTT interface and the measurement report component 1165 may transmit a measurement report to the base station. Additionally, the handover command component 1170 may receive a handover command based on the measurement report.

In some cases, the handover command instructs the UE to perform a handover from a packet switched network to a circuit switched network.

The buffer request component 1175 may transmit a buffer request to a real-time text (RTT) interface based on the handover command, where the first texting mode is an RTT mode, and where receiving the buffered text data is based on transmitting the text buffer request.

The text data communicating component 1180 may communicate the second text data between the modem and the TTY device via the communication channel.

Figure 12:
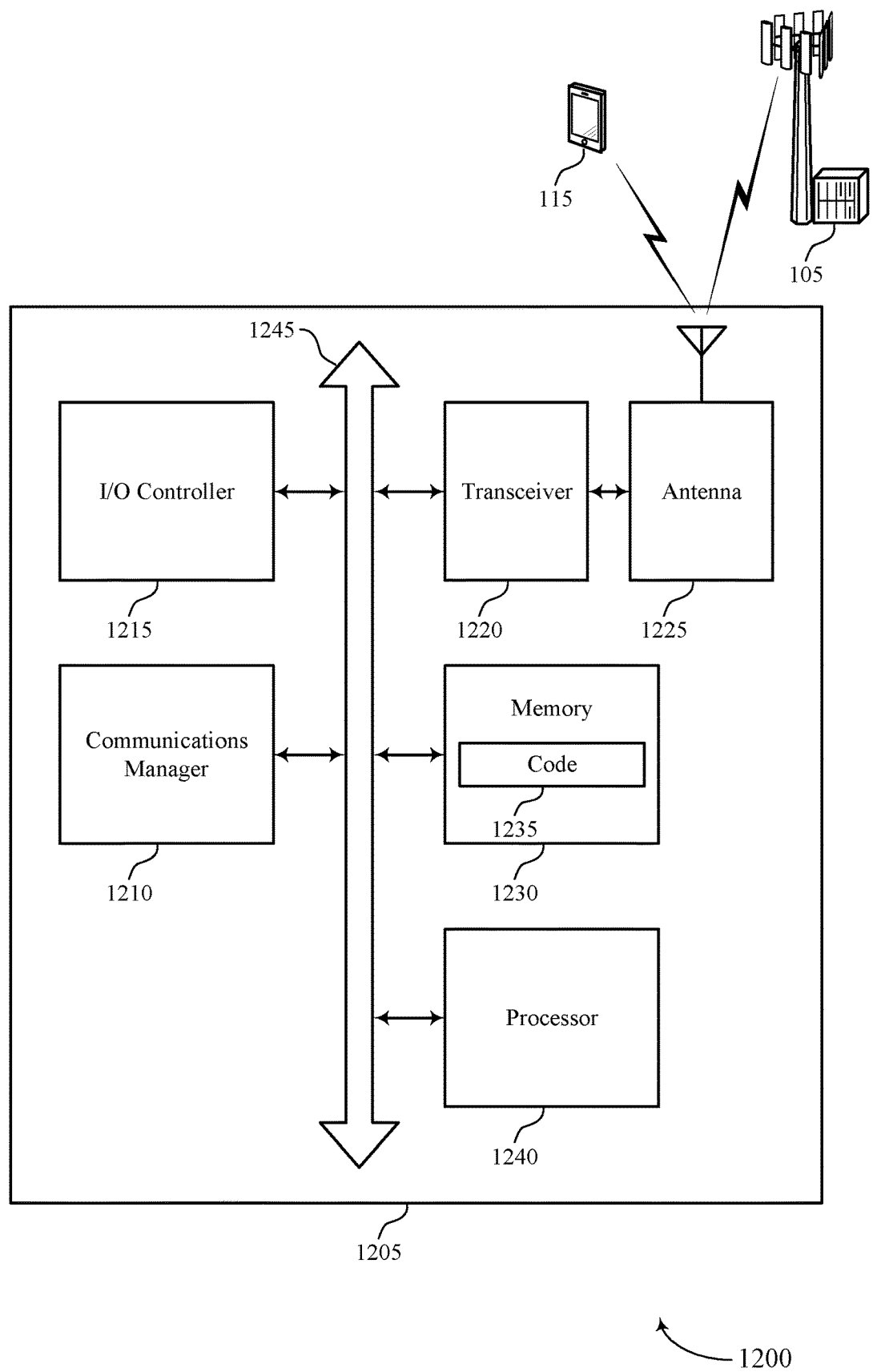
FIG. 12 shows a diagram of a system including a device that supports service continuity of real-time text and teletypewriter modes in accordance with aspects of the present disclosure.

FIG. 12 shows a diagram of a system 1200 including a device 1205 that supports service continuity of real-time text and teletypewriter modes in accordance with aspects of the present disclosure. The device 1205 may be an example of or include the components of device 905, device 1005, or a UE 115 as described herein. The device 1205 may include components for bi-directional voice and data communications including components for transmitting and receiving communications, including a communications manager 1210, an I/O controller 1215, a transceiver 1220, an antenna 1225, memory 1230, and a processor 1240. These components may be in electronic communication via one or more buses (e.g., bus 1245).

The communications manager 1210 may transmit, via a texting session, first text data to a base station while operating in a first texting mode, transmit, via the texting session, second text data to the base station while operating in the second texting mode, determine to perform a mode switch to switch from operating in the first texting mode to operating in a second texting mode, receive buffered text data of the texting session, and initiate the second texting mode based on receiving the buffered text data and determining to perform the mode switch.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1235 including instructions that, when executed, cause the processor to perform various functions described herein. In some cases, the memory 2130 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting service continuity of real-time text and teletypewriter modes).

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
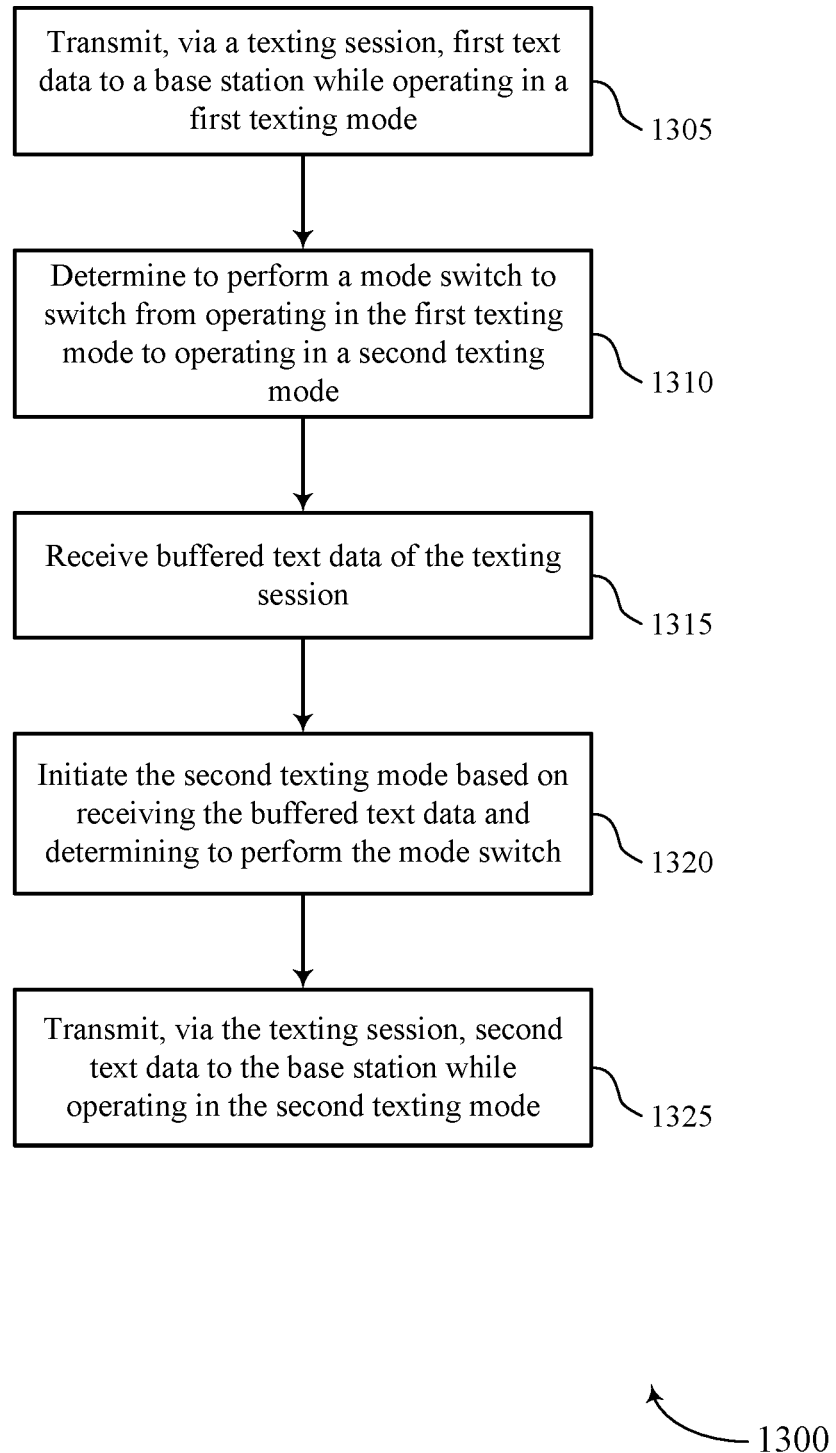
FIGS. 13 through 16 show flowcharts illustrating methods that support service continuity of real-time text and teletypewriter modes in accordance with aspects of the present disclosure.

FIG. 13 shows a flowchart illustrating a method 1300 that supports service continuity of real-time text and teletypewriter modes in accordance with aspects of the present disclosure. The operations of method 1300 may be implemented by a UE 115 or its components as described herein. For example, the operations of method 1300 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1305, the UE may transmit, via a texting session, first text data to a base station while operating in a first texting mode. The operations of 1305 may be performed according to the methods described herein. In some examples, aspects of the operations of 305 may be performed by a texting session component as described with reference to FIGS. 9 through 12.

At 1310, the UE may determine to perform a mode switch to switch from operating in the first texting mode to operating in a second texting mode. The operations of 1310 may be performed according to the methods described herein. In some examples, aspects of the operations of 1310 may be performed by a mode switching component as described with reference to FIGS. 9 through 12.

At 1315, the UE may receive buffered text data of the texting session. The operations of 1315 may be performed according to the methods described herein. In some examples, aspects of the operations of 1315 may be performed by a text data buffering component as described with reference to FIGS. 9 through 12.

At 1320, the UE may initiate the second texting mode based on receiving the buffered text data and determining to perform the mode switch. The operations of 1320 may be performed according to the methods described herein. In some examples, aspects of the operations of 1320 may be performed by a texting mode component as described with reference to FIGS. 9 through 12.

At 1325, the UE may transmit, via the texting session, second text data to the base station while operating in the second texting mode. The operations of 1325 may be performed according to the methods described herein. In some examples, aspects of the operations of 1325 may be performed by a texting session component as described with reference to FIGS. 9 through 12.

Figure 14:
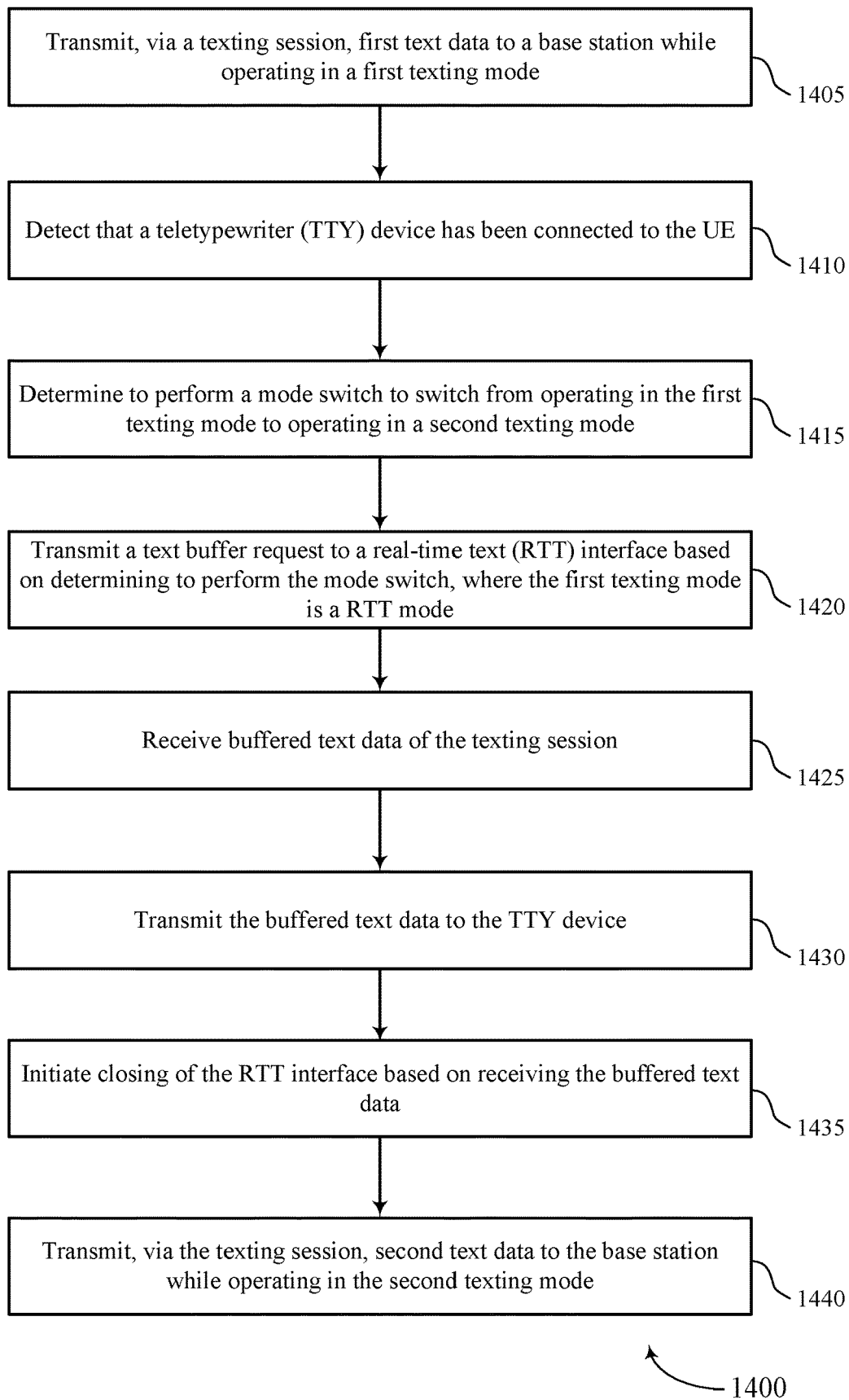

FIG. 14 shows a flowchart illustrating a method 1400 that supports service continuity of real-time text and teletypewriter modes in accordance with aspects of the present disclosure. The operations of method 1400 may be implemented by a UE 115 or its components as described herein. For example, the operations of method 1400 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1405, the UE may transmit, via a texting session, first text data to a base station while operating in a first texting mode. The operations of 1405 may be performed according to the methods described herein. In some examples, aspects of the operations of 1405 may be performed by a texting session component as described with reference to FIGS. 9 through 12.

At 1410, the UE may detect that a TTY device has been connected to the UE. The operations of 1410 may be performed according to the methods described herein. In some examples, aspects of the operations of 1410 may be performed by a device detecting component as described with reference to FIGS. 9 through 12.

At 1415, the UE may determine to perform a mode switch to switch from operating in the first texting mode to operating in a second texting mode. The operations of 1415 may be performed according to the methods described herein. In some examples, aspects of the operations of 1415 may be performed by a mode switching component as described with reference to FIGS. 9 through 12.

At 1420, the UE may transmit a text buffer request to a real-time text (RTT) interface based on determining to perform the mode switch, where the first texting mode is an RTT mode. The operations of 1420 may be performed according to the methods described herein. In some examples, aspects of the operations of 1420 may be performed by a text buffer requesting component as described with reference to FIGS. 9 through 12.

At 1425, the UE may receive buffered text data of the texting session. The operations of 1425 may be performed according to the methods described herein. In some examples, aspects of the operations of 1425 may be performed by a text data buffering component as described with reference to FIGS. 9 through 12.

At 1430, the UE may transmit the buffered text data to the TTY device. The operations of 1430 may be performed according to the methods described herein. In some examples, aspects of the operations of 1430 may be performed by a text data buffering component as described with reference to FIGS. 9 through 12.

At 1435, the UE may initiate closing of the RTT interface based on receiving the buffered text data. The operations of 1435 may be performed according to the methods described herein. In some examples, aspects of the operations of 1435 may be performed by an interface closing component as described with reference to FIGS. 9 through 12.

At 1440, the UE may transmit, via the texting session, second text data to the base station while operating in the second texting mode. The operations of 1440 may be performed according to the methods described herein. In some examples, aspects of the operations of 1440 may be performed by a texting session component as described with reference to FIGS. 9 through 12.

Figure 15:
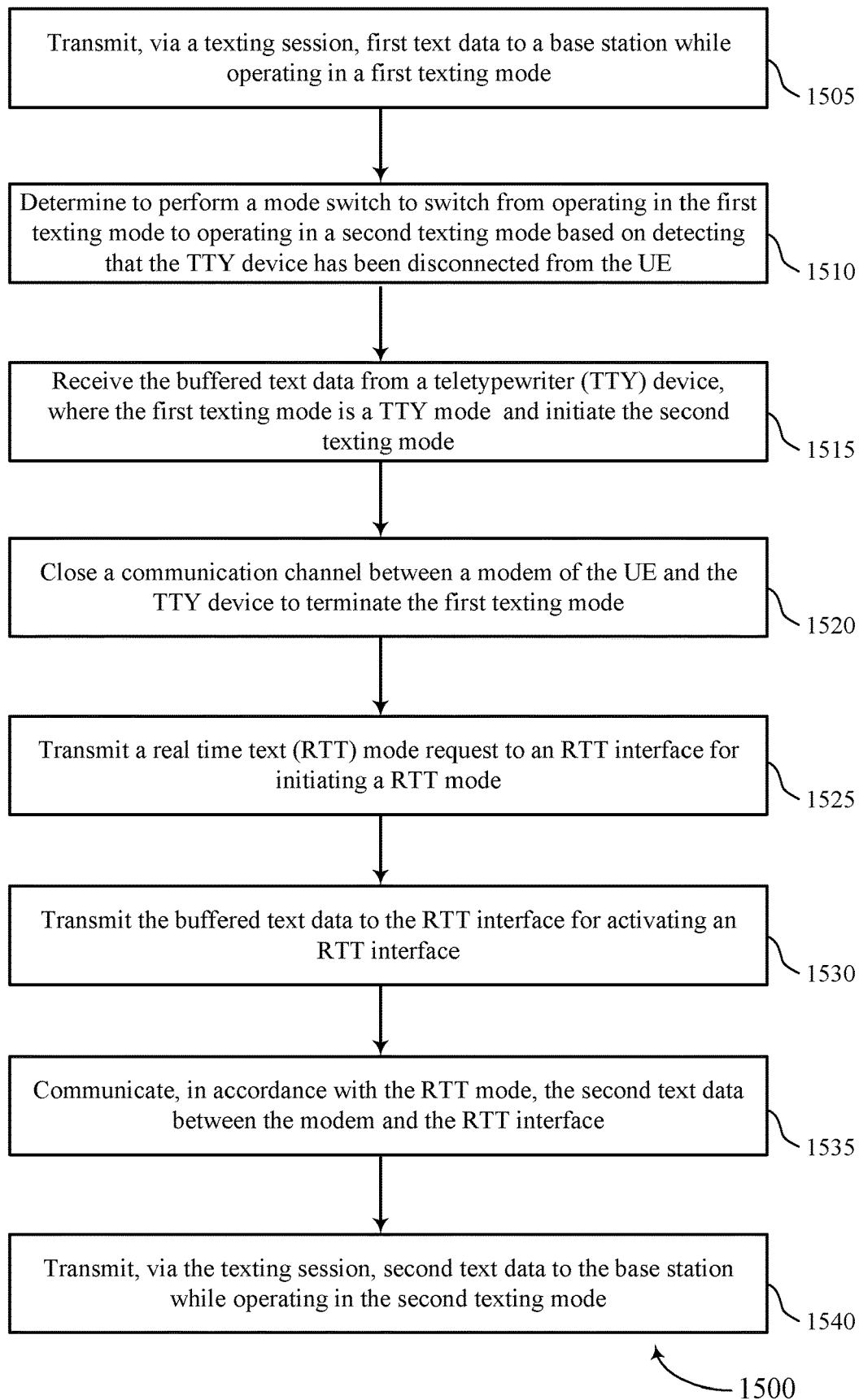

FIG. 15 shows a flowchart illustrating a method 1500 that supports service continuity of real-time text and teletypewriter modes in accordance with aspects of the present disclosure. The operations of method 1500 may be implemented by a UE 115 or its components as described herein. For example, the operations of method 1500 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1505, the UE may transmit, via a texting session, first text data to a base station while operating in a first texting mode. The operations of 1505 may be performed according to the methods described herein. In some examples, aspects of the operations of 1505 may be performed by a texting session component as described with reference to FIGS. 9 through 12.

At 1510, the UE may determine to perform a mode switch to switch from operating in the first texting mode to operating in a second texting mode based on detecting that the TTY device has been disconnected from the UE. The operations of 1510 may be performed according to the methods described herein. In some examples, aspects of the operations of 1510 may be performed by a mode switching component as described with reference to FIGS. 9 through 12.

At 1515, the UE may receive buffered text data of the texting session. The operations of 1515 may be performed according to the methods described herein. In some examples, aspects of the operations of 1515 may be performed by a text data buffering component as described with reference to FIGS. 9 through 12.

At 1520, the UE may close a communication channel between a modem of the UE and the TTY device to terminate the first texting mode, the modem including a modem text interface. The operations of 1520 may be performed according to the methods described herein. In some examples, aspects of the operations of 1520 may be performed by a communication channel component as described with reference to FIGS. 9 through 12.

At 1525, the UE may transmit an RTT mode request to an RTT interface for initiating an RTT mode, where the second texting mode is the RTT mode. The operations of 1525 may be performed according to the methods described herein. In some examples, aspects of the operations of 1525 may be performed by a mode switching component as described with reference to FIGS. 9 through 12.

At 1530, the UE may transmit the buffered text data to the RTT interface for activating an RTT interface. The operations of 1530 may be performed according to the methods described herein. In some examples, aspects of the operations of 1530 may be performed by a text data buffering component as described with reference to FIGS. 9 through 12.

At 1535, the UE may communicate, in accordance with the RTT mode, the second text data between the modem and the RTT interface. The operations of 1535 may be performed according to the methods described herein. In some examples, aspects of the operations of 1535 may be performed by a text data communicating component as described with reference to FIGS. 9 through 12.

At 1540, the UE may transmit, via the texting session, second text data to the base station while operating in the second texting mode. The operations of 1540 may be performed according to the methods described herein. In some examples, aspects of the operations of 1540 may be performed by a texting session component as described with reference to FIGS. 9 through 12.

Figure 16:
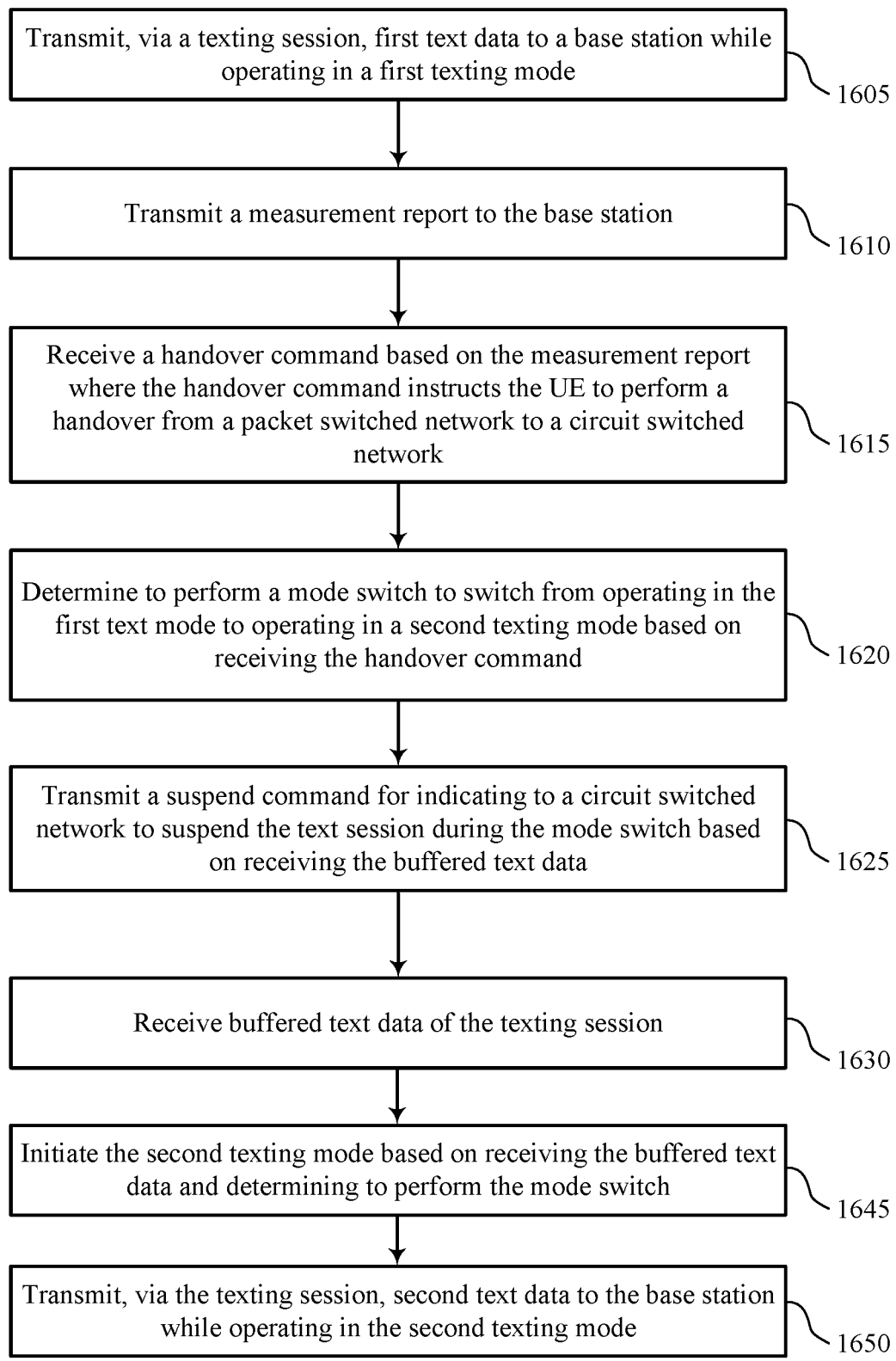

FIG. 16 shows a flowchart illustrating a method 1600 that supports service continuity of real-time text and teletypewriter modes in accordance with aspects of the present disclosure. The operations of method 1600 may be implemented by a UE 115 or its components as described herein. For example, the operations of method 1600 may be performed by a communications manager as described with reference to FIGS. 9 through 12. In some examples, a UE may execute a set of instructions to control the functional elements of the UE to perform the functions described below. Additionally or alternatively, a UE may perform aspects of the functions described below using special-purpose hardware.

At 1605, the UE may transmit, via a texting session, first text data to a base station while operating in a first texting mode. The operations of 1605 may be performed according to the methods described herein. In some examples, aspects of the operations of 1605 may be performed by a texting session component as described with reference to FIGS. 9 through 12.

At 1610, the UE may transmit a measurement report to the base station. The operations of 1610 may be performed according to the methods described herein. In some examples, aspects of the operations of 1610 may be performed by a measurement report component as described with reference to FIGS. 9 through 12.

At 1615, the UE may receive a handover command based on the measurement report. The operations of 1615 may be performed according to the methods described herein. In some examples, aspects of the operations of 1615 may be performed by a handover command component as described with reference to FIGS. 9 through 12.

At 1620, the UE may determine to perform a mode switch to switch from operating in the first texting mode to operating in a second texting mode. The operations of 1620 may be performed according to the methods described herein. In some examples, aspects of the operations of 1620 may be performed by a mode switching component as described with reference to FIGS. 9 through 12.

At 1625, the UE may transmit a suspend command for indicating to a circuit switched network to suspend the text session during the mode switch based on receiving the buffered text data. The operations of 1625 may be performed according to the methods described herein. In some examples, aspects of the operations of 1625 may be performed by a handover command component as described with reference to FIGS. 9 through 12.

At 1630, the UE may receive buffered text data of the texting session. The operations of 1630 may be performed according to the methods described herein. In some examples, aspects of the operations of 1630 may be performed by a text data buffering component as described with reference to FIGS. 9 through 12.

At 1645, the UE may initiate the second texting mode based on receiving the buffered text data and determining to perform the mode switch. The operations of 1645 may be performed according to the methods described herein. In some examples, aspects of the operations of 1645 may be performed by a texting mode component as described with reference to FIGS. 9 through 12.

At 1650, the UE may transmit, via the texting session, second text data to the base station while operating in the second texting mode. The operations of 1650 may be performed according to the methods described herein. In some examples, aspects of the operations of 1650 may be performed by a texting session component as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (e.g., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication by a user equipment (UE), comprising:
    transmitting, via a texting session, first text data to a base station while the UE is operating in a first texting mode;
    determining to perform a mode switch to switch the UE from operating in the first texting mode to operating in a second texting mode;
    receiving buffered text data of the texting session based at least in part on determining to perform the mode switch;
    initiating the second texting mode based at least in part on receiving the buffered text data and determining to perform the mode switch; and
    transmitting, via the texting session, second text data to the base station while operating in the second texting mode.

2. The method of claim 1, wherein the first texting mode is one of a teletypewriter (TTY) mode and a real-time text (RTT) mode and the second texting mode is the other of the TTY mode and the RTT mode.

3. The method of claim 1, further comprising:
    transmitting a text buffer request to a real-time text (RTT) interface based at least in part on determining to perform the mode switch, wherein the first texting mode is an RTT mode.

4. The method of claim 3, further comprising:
    initiating closing of the RTT interface based at least in part on receiving the buffered text data.

5. The method of claim 1, wherein initiating the second texting mode further comprises:
    detecting that a teletypewriter (TTY) device has been connected to the UE; and
    transmitting the buffered text data to the TTY device.

6. The method of claim 5, wherein initiating the second texting mode further comprises:
    activating an input control associated with the TTY device;
    establishing a communication channel between a modem of the UE and the TTY device; and
    communicating the second text data between the modem and the TTY device via the communication channel.

7. The method of claim 5, wherein detecting that the TTY device has been connected further comprises:
    receiving a signal from the TTY device.

8. The method of claim 1, wherein receiving the buffered text data further comprises:
    receiving the buffered text data from a teletypewriter (TTY) device, wherein the first texting mode is a TTY mode.

9. The method of claim 8, wherein initiating the second texting mode further comprises:
    detecting that the TTY device has been disconnected from the UE.

10. The method of claim 8, further comprising:
    closing a communication channel between a modem of the UE and the TTY device to terminate the first texting mode.

11. The method of claim 1, wherein initiating the second texting mode further comprises:
    transmitting an initiate real-time text (RTT) mode request to an RTT interface for initiating an RTT mode, wherein the second texting mode is the RTT mode.

12. The method of claim 11, wherein initiating the second texting mode further comprises:
    initiating a back-off timer for a fallback voice call based at least in part on transmitting the initiate RTT mode request.

13. The method of claim 12, wherein initiating the second texting mode further comprises:
    terminating the back-off timer based at least in part on receiving an indication that the RTT mode has been initiated.

14. The method of claim 12, wherein initiating the second texting mode further comprises:
    transmitting the buffered text data to the RTT interface for activating an RTT interface; and
    communicating, in accordance with the RTT mode, the second text data between a modem and the RTT interface.

15. The method of claim 1, wherein receiving the buffered text data further comprises:
    receiving an indication that a real-time text (RTT) mode has been initiated, wherein the second texting mode is the RTT mode;
    transmitting a text buffer request to a teletypewriter (TTY) device based at least in part on the indication; and receiving the buffered text data based at least in part on the text buffer request.

16. The method of claim 15, further comprising:
closing a communication channel between a modem of the UE and the TTY device based at least in part on receiving the buffered text data.

17. The method of claim 15, wherein initiating the second texting mode further comprises:
transmitting a request to activate an RTT interface; and
communicating, in accordance with the RTT mode, the second text data between a modem and the RTT interface.

18. The method of claim 1, further comprising:
transmitting a measurement report to the base station; and
receiving a handover command based at least in part on the measurement report.

19. The method of claim 18, wherein determining to perform the mode switch further comprises:
determining to perform the mode switch based at least in part on receiving the handover command.

20. The method of claim 18, wherein the handover command instructs the UE to perform a handover from a packet switched network to a circuit switched network.

21. The method of claim 18, further comprising:
transmitting a suspend command for indicating to a circuit switched network to suspend the texting session during the mode switch based at least in part on receiving the buffered text data.

22. The method of claim 18, further comprising:
transmitting a buffer request to a real-time text (RTT) interface based at least in part on the handover command, wherein the first texting mode is an RTT mode, and wherein receiving the buffered text data is based at least in part on transmitting the text buffer request.

23. The method of claim 18, further comprising:
transmitting the buffered text data to a teletypewriter (TTY) device;
activating an input control associated with the TTY device;
establishing a communication channel between a modem of the UE and the TTY device; and
communicating the second text data between the modem and the TTY device via the communication channel.

24. An apparatus for wireless communication by a user equipment (UE), comprising:
a processor,
memory in electronic communication with the processor; and
instructions stored in the memory and executable by the processor to cause the apparatus to:
transmit, via a texting session, first text data to a base station while the UE is operating in a first texting mode;
determine to perform a mode switch to switch the UE from operating in the first texting mode to operating in a second texting mode;
receive buffered text data of the texting session based at least in part on determining to perform the mode switch;
initiate the second texting mode based at least in part on receiving the buffered text data and determining to perform the mode switch; and
transmit, via the texting session, second text data to the base station while operating in the second texting mode.

25. The apparatus of claim 24, wherein the first texting mode is one of a teletypewriter (TTY) mode and a real-time text (RTT) mode and the second texting mode is the other of the TTY mode and the RTT mode.

26. The apparatus of claim 24, wherein the instructions are further executable by the processor to cause the apparatus to:
transmit a text buffer request to a real-time text (RTT) interface based at least in part on determining to perform the mode switch, wherein the first texting mode is an RTT mode.

27. The apparatus of claim 26, wherein the instructions are further executable by the processor to cause the apparatus to:
initiate closing of the RTT interface based at least in part on receiving the buffered text data.

28. The apparatus of claim 24, wherein the instructions to initiate the second texting mode further are executable by the processor to cause the apparatus to:
detect that a teletypewriter (TTY) device has been connected to the UE; and
transmit the buffered text data to the TTY device.

29. An apparatus for wireless communication by a user equipment (UE), comprising:
means for transmitting, via a texting session, first text data to a base station while the UE is operating in a first texting mode;
means for determining to perform a mode switch to switch the UE from operating in the first texting mode to operating in a second texting mode;
means for receiving buffered text data of the texting session based at least in part on determining to perform the mode switch;
means for initiating the second texting mode based at least in part on receiving the buffered text data and determining to perform the mode switch; and
means for transmitting, via the texting session, second text data to the base station while operating in the second texting mode.

30. A non-transitory computer-readable medium storing code for wireless communication by a user equipment (UE), the code comprising instructions executable by a processor to:
transmit, via a texting session, first text data to a base station while the UE is operating in a first texting mode;
determine to perform a mode switch to switch the UE from operating in the first texting mode to operating in a second texting mode;
receive buffered text data of the texting session based at least in part on determining to perform the mode switch;
initiate the second texting mode based at least in part on receiving the buffered text data and determining to perform the mode switch; and
transmit, via the texting session, second text data to the base station while operating in the second texting mode.

* * * * *